United States Patent
Affaticati et al.

(10) Patent No.: US 6,513,641 B1
(45) Date of Patent: Feb. 4, 2003

(54) HIGH RATE INDUCTION SYSTEM

(75) Inventors: Artemio Affaticati, Cadeo (IT); Claudio Cerutti, Borgomanero (IT)

(73) Assignee: Rapistan Systems Advertising Corp., Grand Rapids, MI (US)

(*) Notice: Subject to any disclaimer, the term of this patent is extended or adjusted under 35 U.S.C. 154(b) by 87 days.

(21) Appl. No.: 09/669,170

(22) Filed: Sep. 25, 2000

Related U.S. Application Data

(60) Provisional application No. 60/158,679, filed on Oct. 12, 1999.

(51) Int. Cl.$^7$ ............................................. B65G 47/46
(52) U.S. Cl. .................. 198/357; 198/370.01; 198/444; 198/448; 198/460.1
(58) Field of Search ................................ 198/357, 444, 198/448, 460.1, 370.01–371.3

(56) References Cited

U.S. PATENT DOCUMENTS

| | | | |
|---|---|---|---|
| 3,485,339 A | | 12/1969 | Miller et al. |
| 3,799,319 A | * | 3/1974 | Cutler et al. ............... 198/416 |
| 3,880,298 A | * | 4/1975 | Habegger et al. ...... 198/349.95 |
| 5,038,911 A | | 8/1991 | Doane et al. |
| 5,127,510 A | * | 7/1992 | Cotter et al. ........... 198/370.02 |
| 5,267,638 A | | 12/1993 | Doane |
| 5,341,916 A | | 8/1994 | Doane et al. |
| 5,588,520 A | | 12/1996 | Affaticati et al. |
| 5,782,332 A | | 7/1998 | Guidetti et al. |
| 5,979,636 A | | 11/1999 | Vanacore et al. |
| 6,129,199 A | * | 10/2000 | Cretener et al. ............ 198/357 |
| 6,209,703 B1 | * | 4/2001 | Soldavini ............... 198/370.06 |

FOREIGN PATENT DOCUMENTS

| | | |
|---|---|---|
| GB | 2144698 A | 3/1985 |
| WO | WO9302811 | 2/1993 |
| WO | WO9405572 | 3/1994 |
| WO | WO9709256 | 3/1997 |
| WO | WO9941169 | 8/1999 |

OTHER PUBLICATIONS

Patent Cooporation Treaty (PCT) International Search Report (full and partial reports) in Application No. PCT/EP00/10068, which corresponds to the parent of the present application.

Commonly assigned co–pending U.S. application Ser. No. 09/851,021, filed on May 8, 2001, entitled Conveyor Induction System (RAP04 P–608B).

* cited by examiner

*Primary Examiner*—Christopher P. Ellis
*Assistant Examiner*—Mark A. Deuble
(74) *Attorney, Agent, or Firm*—Van Dyke, Gardner, Linn & Burkhart, LLP

(57) ABSTRACT

A sortation system and method of inducting product are useful with a sorter having a continuous member defining a plurality of transport positions of the continuous member and a plurality of sort destinations for receiving product discharged from the continuous member. At least one induction unit is provided including a plurality of tandem conveying units. Product is received with the at least one induction unit from a product source and discharged from the at least one induction unit to the continuous member. According to one aspect of the invention, the at least one induction unit follows the speed of the continuous member. This includes starting as soon as the continuous member is moving and decreasing in speed substantially only when the continuous member decreases in speed. The invention is useful with linear sorters, such as positive displacement sorters, and the like. The invention is also useful with carousel sorters, such as tilt-tray sorters and cross-belt sorters.

30 Claims, 20 Drawing Sheets

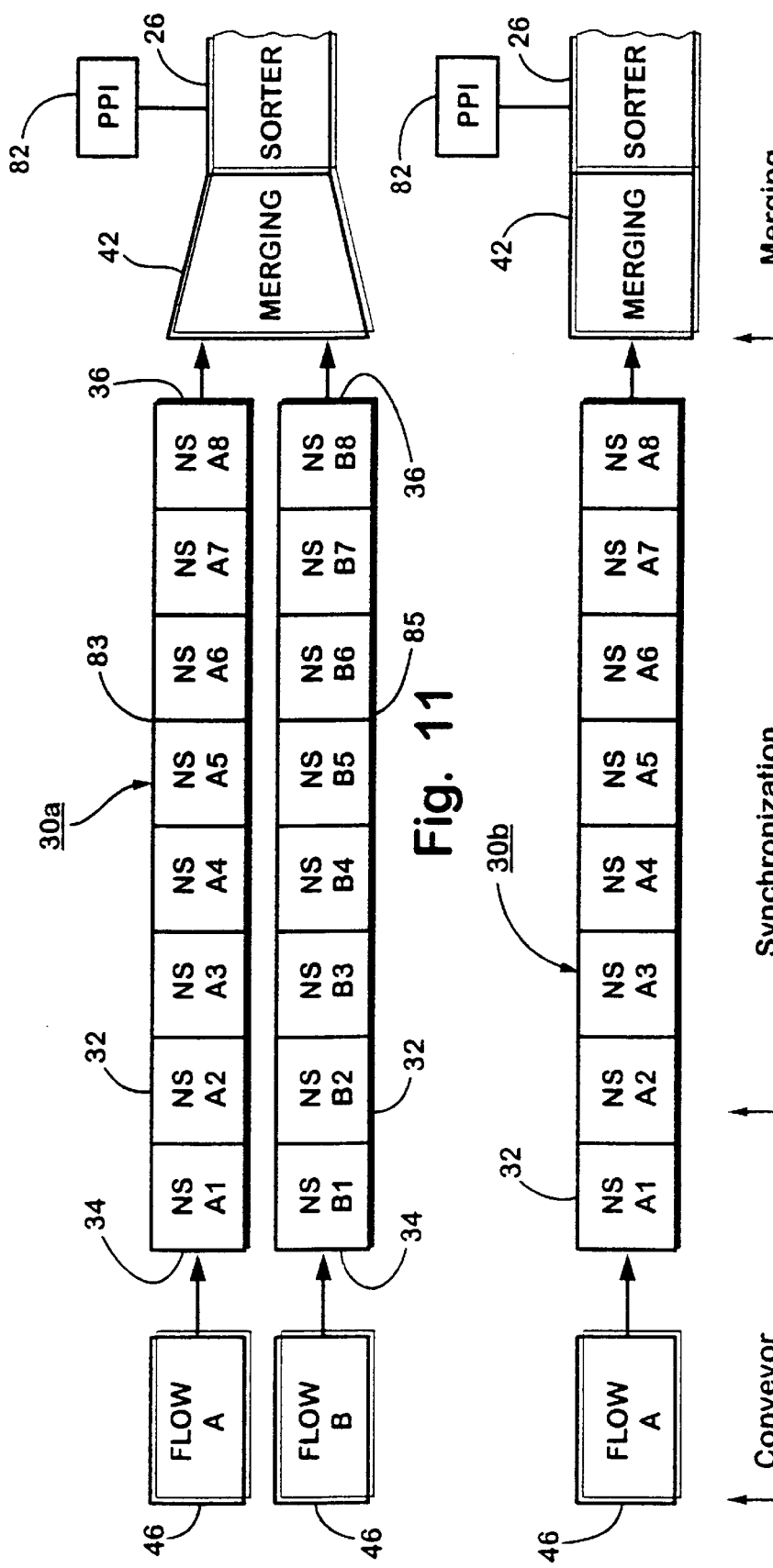

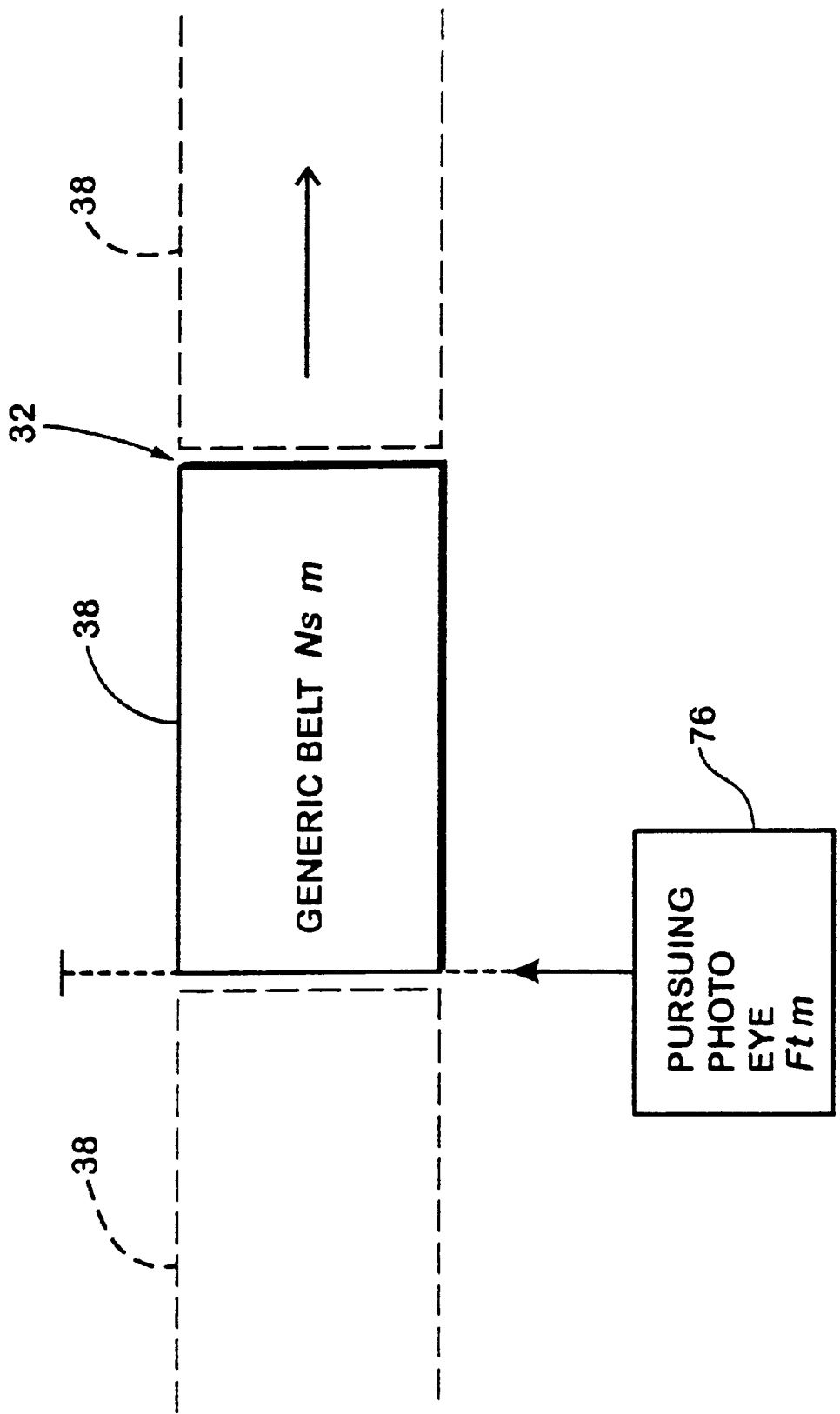

HIGH RATE INDUCTION SYSTEM

CROSS-REFERENCE TO RELATED APPLICATION

This application claims priority from United States provisional patent application Ser. No. 60/158,679 filed on Oct. 12, 1999, the disclosure of which is hereby incorporated herein by reference in its entirety.

BACKGROUND OF THE INVENTION

This invention pertains to conveyor sortation systems and, in particular, to a method and apparatus for inducting product to a sorter, wherein the sorter includes a continuous conveying member defining a plurality of transport positions and a plurality of sort destinations for receiving product discharged from the continuous member. The invention has application to both linear sorters, such as positive displacement sorters, and carousel sorters, such as tilt-tray and cross-belt sorters.

The quintessential goal for any material-handling system is to maximize the throughput of product through the system. In the case of a sorter, it is known that the throughput of the sorter is limited by the ability of the system to induct product to the sorter at a rate that matches the throughput of the sorter, with adequate gaps between the product. If an insufficient rate of product is supplied to the sorter, then the sorter becomes starved and is incapable of meeting its rated throughput.

A common technique for keeping the sorter supplied with product is to build accumulation into the system upstream of the induct. With a backlog of product at the input to the induct, the function of the induct becomes limited to ensuring that adequate product gaps are developed and, in the case of multiple-line inducts, that the products are merged together from the multiple lines. However, accumulation comes at a cost and is not always feasible. For example, some systems require that substantially all of the conveyors be of the belt variety. This is especially common in the parcel-handling industry where packages may be poorly packaged and may include protruding items from the packages. The use of live-roller conveyors, which are the common form of accumulation, is considered to be inappropriate for handling such parcels. Accordingly, the ability to induct product to the sorter at an adequate rate becomes difficult when accumulation upstream of the sorter is not practical, such as where the conveyors, are of the belt variety.

Carousel-type sorter systems are known to be able to handle product of a wide range of characteristics and can be compact and configured in many different ways. In particular, the induct systems and the destination chutes, or conveyors, can be arranged at any place along the carousel and can be arranged on one or both sides of the carousel. In order to provide maximum product throughput with a carousel sorter, empty units are booked, or reserved, for product positioned on the induct. However, a particular timing window must exist in order to accelerate the product to the speed of the carousel to meet the booking requirement for a particular empty carrying unit. If this window cannot be met, it is necessary for the carrier to pass by the induct without a product being loaded on that unit. It should be apparent that the more carriers that pass by the induct without receiving a product, the lower the throughput of the carousel-type sortation system. Conversely, the throughput of a carousel-type sorter can be increased by ensuring a maximum loading of the carriers passing by an induct.

SUMMARY OF THE INVENTION

The present invention provides a sortation system and a method of inducting to a sortation system which increases the performance of the sorter by ensuring an improved supply of product to the sorter.

A sortation system and method of inducting product to a sorter, according to an aspect of the invention, is useful with a sorter having a continuous member defining a plurality of transport positions of the continuous member and a plurality of sort destinations for receiving product discharged from the continuous member. An induction system is provided that includes at least one induction unit having a receiving end for receiving product from a product source and a discharge end for discharging product to the continuous member. The at least one induction unit includes a plurality of tandem-conveying units between the receiving end and the discharge end and a control controlling the conveying units. According to this aspect of the invention, the at least one induction unit follows a speed of the continuous member. This includes starting substantially as soon as the continuous member is moving and decreasing in speed substantially only when the continuous member decreases in speed.

This aspect of the invention allows an induction system which does not require accumulation upstream of the induction system. Furthermore, bookings of product on the induction unit can be maintained, notwithstanding variation in speed of the continuous member.

A sortation system and method of inducting product to a sorter, according to another aspect of the invention, is useful with a sorter having a continuous member defining a plurality of transport positions of the continuous member and a plurality of sort destinations for receiving product discharged from the continuous member. An induction system is provided having at least two induction units. Each of the induction units has a receiving end for receiving product from a product source and a discharge end for discharging product to the continuous member. The sorter further includes a control which determines gap between product that will be discharged to the continuous member. The induction unit is capable of discharging product to the continuous member irrespective of the gap between product.

This aspect of the invention also facilitates the ability of the induction unit to follow the speed of the continuous member because it is not necessary to shut down the induction unit when a product having an improper gap is detected. Rather, the product with the improper gap may be discharged to the continuous member and either sorted to a special lane or recirculated to the induction subsystem.

A sortation system and method of inducting product to a sorter, according to another aspect of the invention, is useful with a sorter including a continuous member defining a plurality of transport positions of the continuous member and a plurality of sort destinations for receiving product discharged from the continuous member. An induction system is provided having at least one induction unit with a receiving end for receiving product from a product source and a discharge end for discharging product to the continuous member. The at least one induction unit includes a plurality of tandem conveying units between the receiving end and a discharge end and a control for controlling the conveying units. According to this aspect of the invention, the control books at least one transport position for receipt of product from the at least one induction unit. The control books a transport unit for a product when that product is at a booking conveying unit and adjusts relative spacing between a product and the respective transport position booked for that product on the conveying units downstream of the booking conveying unit.

This aspect of the invention allows multiple product to be booked on the at least one induction unit and awaiting discharge to the continuous member. Furthermore, by booking the transport position for a product at an upstream portion of the at least one induction unit enhances the ability of the induction system to ensure an acceptable gap between the products discharged to the continuous member.

A sortation system and method of inducting product to a sorter, according to another aspect of the invention, is useful with a carousel sorter having a plurality of product carriers arranged in an endless loop and a plurality of sort destinations for receiving product discharged from the carriers. An induction system is provided having at least one induction unit with a receiving end for receiving product from a product source and a discharge end for discharging product to the carriers. The sortation system further includes a control for monitoring product on the carriers and booking carriers for product on the induction system. The control is capable of booking carriers irrespective of whether the carriers are already carrying product.

This aspect of the invention facilitates the booking of carriers well in advance of the induction system, thereby increasing the number of carriers that can be booked at the induction system. If a carrier that is carrying a product is booked, but is unable to discharge its product prior to arriving at the induction system, the booking may be cancelled.

These and other objects, advantages and features of this invention will become apparent upon review of the following specification in conjunction with the drawings.

BRIEF DESCRIPTION OF THE DRAWINGS

FIG. 10 is a diagrammatical representation of the single-line induction system in FIGS. 3–5;

FIG. 11 is a diagrammatical representation of the multiple-line induction system illustrated in FIGS. 6–9;

FIG. 12 is a diagrammatical representation of a conveying unit used in the invention;

DESCRIPTION OF THE PREFERRED EMBODIMENT

Figure 1:
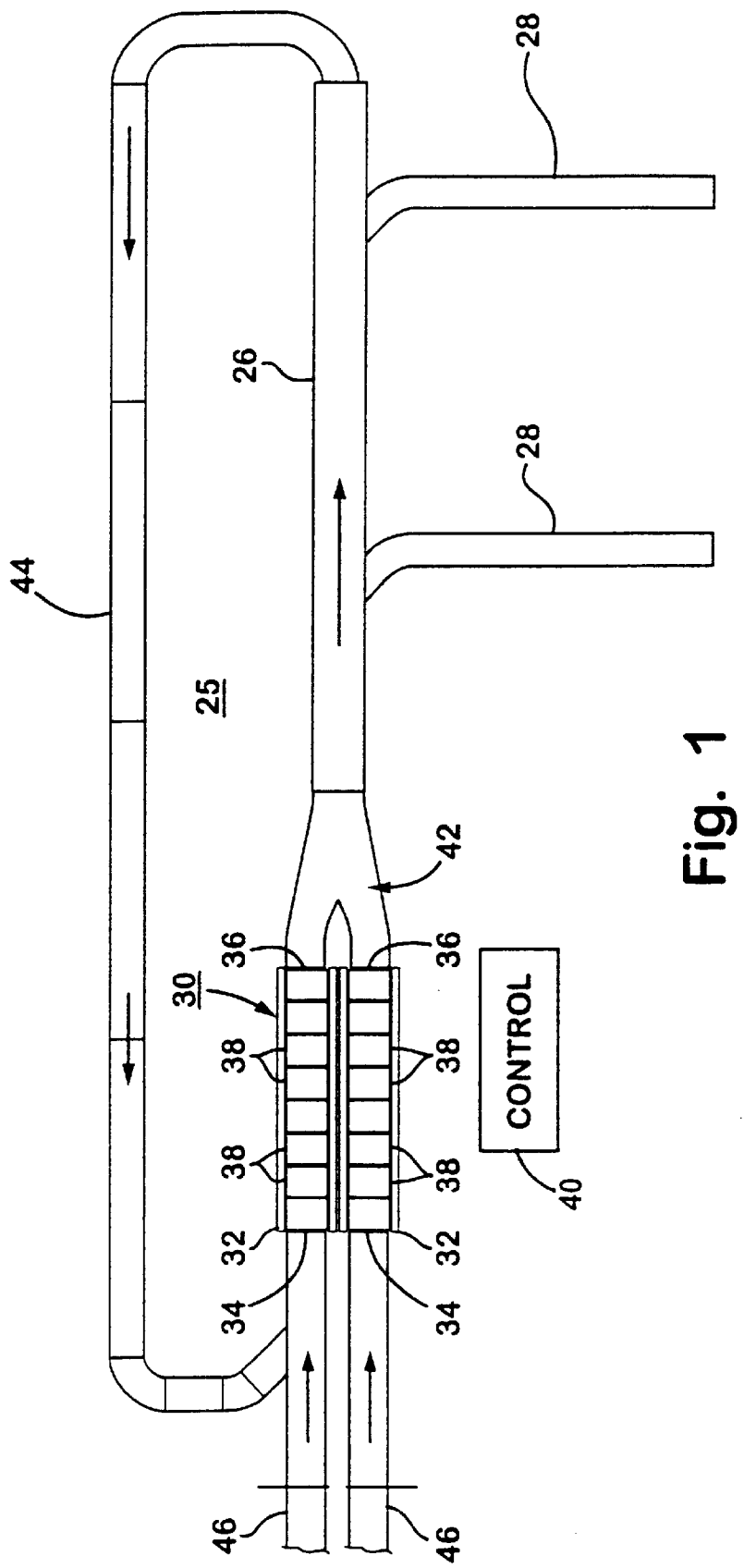
FIG. 1 is a top plan view of a sortation system, according to the invention.

Referring now specifically to the drawings, and the illustrative embodiments depicted therein, a high rate induction system 30 is used with a sortation system 25 including a continuous member 26 and a plurality of sort destinations 28 for receiving products discharged from the continuous member (FIG. 1). In the illustrative embodiment, continuous member 26 is a sortation conveyor and, preferably, a positive displacement sortation conveyor utilizing pusher shoes which travel with the conveying surface, as disclosed in commonly assigned U.S. Pat. No. 5,127,510 entitled MODULAR DIVERTER SHOE AND SLAT CONSTRUCTION, the disclosure of which is hereby incorporated herein by reference. However, the invention is useful with other types of sortation systems known in the art such as tilt wheel sorters, transverse belt sorters, stationary pusher sorters, and the like. Sort destinations 28 may include takeaway conveyors, chutes, or the like, on one or both sides of continuous member 26.

High rate induction system 30 includes at least one and, possibly, two or more induction units 32, each having a receiving end 34 for receiving product from a product source 46 and a discharge end 36 for discharging product to continuous member 26. Each induction unit 32 is made up of a plurality of conveying units 38 which are arranged in tandem between receiving end 34 and discharge end 36. The sortation system further includes a control 40 which controls induction system 30 in conjunction with the components of sortation system 25. Especially, when more than one induction unit 32 is included, the induction units discharge their product to continuous member 26 through a merge 42.

At least one induction unit 32, designated a primary unit, follows the speed of continuous member 26. The primary induction unit 32 starts as soon as the continuous member is moving and decreases in speed only when the continuous member decreases in speed. This is particularly advantageous when the product source 46 does not provide accumulation, such as when the product source is made up of belt conveyors. Although control 40 operates induction system 32 in order to create particular gaps between product discharged to continuous member 26, under certain circumstances, it is not possible to create a sufficient gap to allow the product to be sorted. In a particular mode of operation, primary induction unit 32 is allowed to discharge product, or packages, to continuous member 26, even if a proper gap will not exist between the product. Under such circumstances, product may be returned to the induction system by a recirculation line 44, which itself may preclude accumulation, such as by being made up of belt conveyors. Advantageously, this mode allows master induction units 32 to be operated continuously without stopping. This provides a priority lane for feeding product to the continuous member 26 without substantial interruption.

Control 40 matches, or books, a particular location on continuous member 26 for a product shortly after arriving at receiving end 34. In particular, the booking occurs, preferably, no later than the third conveying unit 38 from receiving end 34. The remaining of the conveying units between the booking conveying unit and the discharge end 36 adjust the relative spacing between the product and the respective transport position booked for that product on the continuous member. In this manner, multiple product can be booked on the induction unit 32 awaiting discharge to continuous member 26. Preferably, the leading edge of a particular pusher shoe on continuous member 26 is used as the transport position, or logical all, for booking a product.

Figure 2:
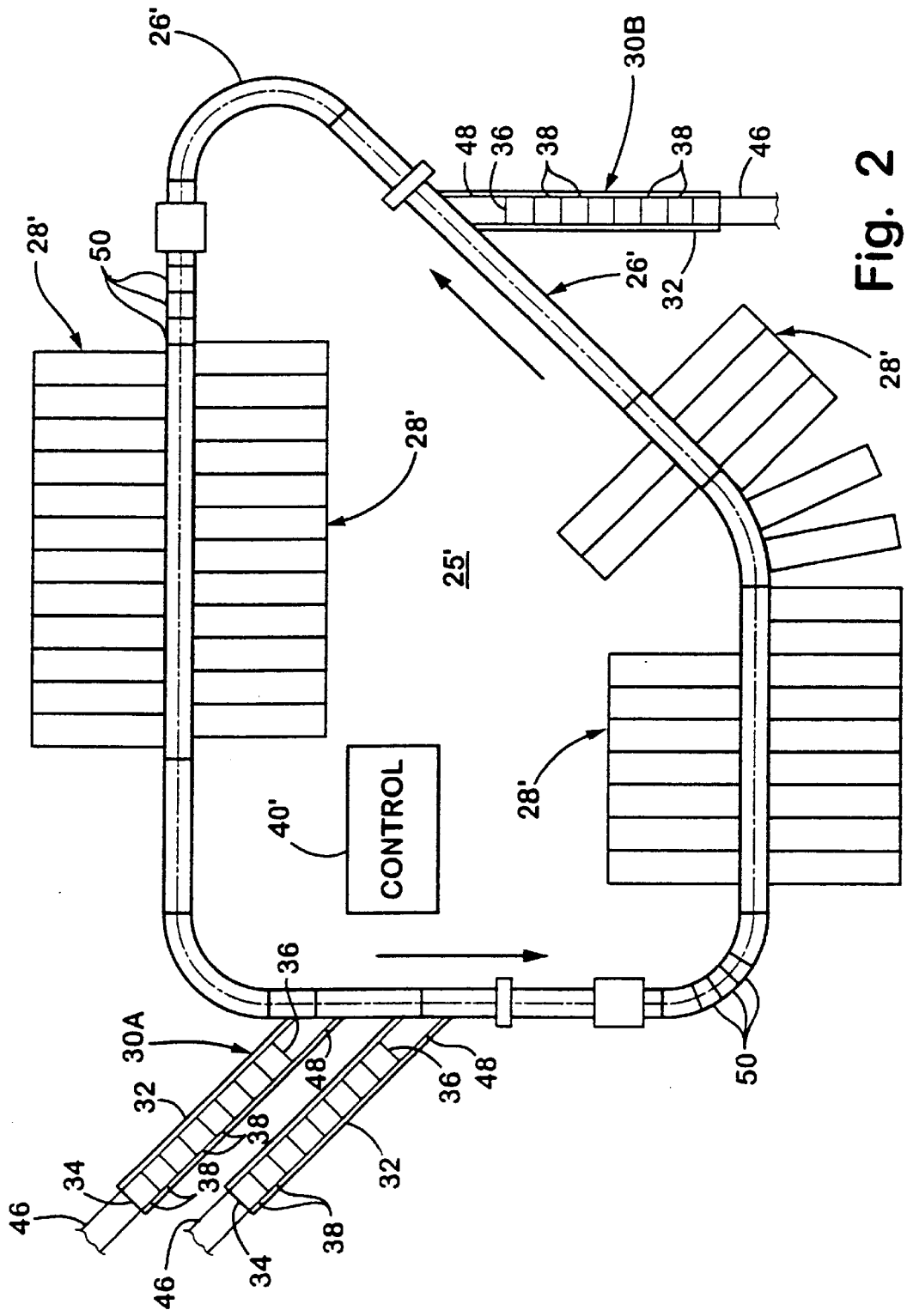
FIG. 2 is the same view as FIG. 1 of an alternative embodiment.

Another embodiment of a high rate induction system according to one aspect of the invention, is illustrated in a sortation system 25' including one or more induction systems 30a, 30b, a continuous member 26' and a plurality of sort destinations 28' for receiving product discharged from the continuous member (FIG. 2). The induction system of sortation system 25' may include a multiple-line induction system 30a, made up of two or more induction units 32, or an induction system 30b, including a single induction unit 32. Each induction unit 32 is identical with that utilized with sortation system 25. However, rather than utilizing a merge 42 to transition product from the discharge end 36 to continuous member 26, induction system 30a, 30b utilizes a transition 48 which is oriented at an acute angle, such as 45°, with continuous member 26'. Continuous member 26' is a carousel-type sorter made up of a plurality of carriers 50 arranged in an endless loop, substantially horizontal, as disclosed in commonly assigned U.S. Pat. No. 5,588,520, entitled CROSS-BELT SORTATION SYSTEM, the disclosure of which is hereby incorporated herein by reference. Two known types of carousel-type sorters are cross-belt sorters and tilt-tray sorters, although variations of these types of sorters are known in the art. Sort destinations 28' may be chutes, gravity conveyors, or the like, for receiving product discharged from continuous member 26'. In the illustrative embodiment, sort destinations 28' are arranged on opposite lateral sides of continuous member 26', but may be positioned on only one side thereof. By its nature, product inducted by induction systems 30a, 30b may be sorted to substantially any sort destination 28' in sortation system 25'. Therefore, it is common for a product carrier of continuous member 26', which collectively travels in an endless loop, to pass an induction system with a product on that carrier. When a carrier passes an induction system with a product on that carrier, it is not possible for the induction system to place a product on that carrier.

Control 40' books one of the carriers 50 for product received at receiving end 34. Preferably, by the time the product reaches the third conveying unit 38 from receiving end 34, control 40' can book that product with a carrier 50. According to the invention, the control is capable of booking carriers, even when a carrier is already carrying product. For example, in the illustrative embodiment, carrier 50 may be carrying a product for discharge at one of the sort destinations 28' at the top of FIG. 2. Control 40' is aware of the destination of the present product on carrier 50 and thereby allows carrier 50 to be booked. If carrier 50 is unable to discharge its product at the intended sort destination prior to arriving at induction system 30a, such as because the destination is full or jammed or the like, control 40' rescinds the booking of that carrier and another carrier is booked for that product.

Each induction unit 32 includes a frame 52 which supports the conveying units 38. Frame 32 defines at least one horizontal surface 54 laterally offset from the conveying units (FIGS. 3–9). Horizontal surface 54 supports a plurality of control input devices 56 and a status indicator 58. The control input devices may include, by way of example, a "start" switch, a "stop" switch, and the like. Status indicator 58 may include multiple color indicators, such as green, yellow, and red, in order to indicate the status of the induction unit 32. Frame 52 additionally includes support legs 60 which define therebetween a control receiving compartment 62. Control receiving compartment 62 supports a control assembly 64. By positioning control assembly 64 in control compartment 62 between legs 60, a necessity for a standalone control cabinet known in the art is preferably obviated. Furthermore, the incorporation of controls 56 and status indicator 58 into frame 52 incorporates all of the control functions within the outline of induction unit 32. This not only allows the induction unit to be more aesthetically pleasing, it also places the controls closer to items that are being controlled thereby.

Each conveying unit 38 includes a belt 66 which extends substantially the width of the conveying surface defined by the conveying units 38. Belt 66 is drivingly supported by a driving roller 68 and an idler roller 70. Driving roller 68 is rotated by a servomotor 72, which drives drive roller 68 through a V belt, cog belt, chain, or the like. Servomotor 72 is either a DC-operated servomotor or a variable frequency AC motor of the type well known in the art. A belt tensioner 74 provides adjustment to the tension of belt 66.

A photo-eye 76 directs a beam between the belts 66 for adjacent conveying units 38 in order to detect the passage of a product from one belt 66 to the downstream tandem belt 66. One such photo-eye is positioned upstream of each conveying unit 38. The construction of each conveying unit 38 facilitates a rapid replacement of the associated belt 66. The belt can be readily replaced by elevating the rollers 68, 70 at the opposite side of the induction unit from servomotor 72, wherein the belt can be readily removed and replaced with a new belt without the necessity for disassembling a significant portion of frame 52.

Figure 3:
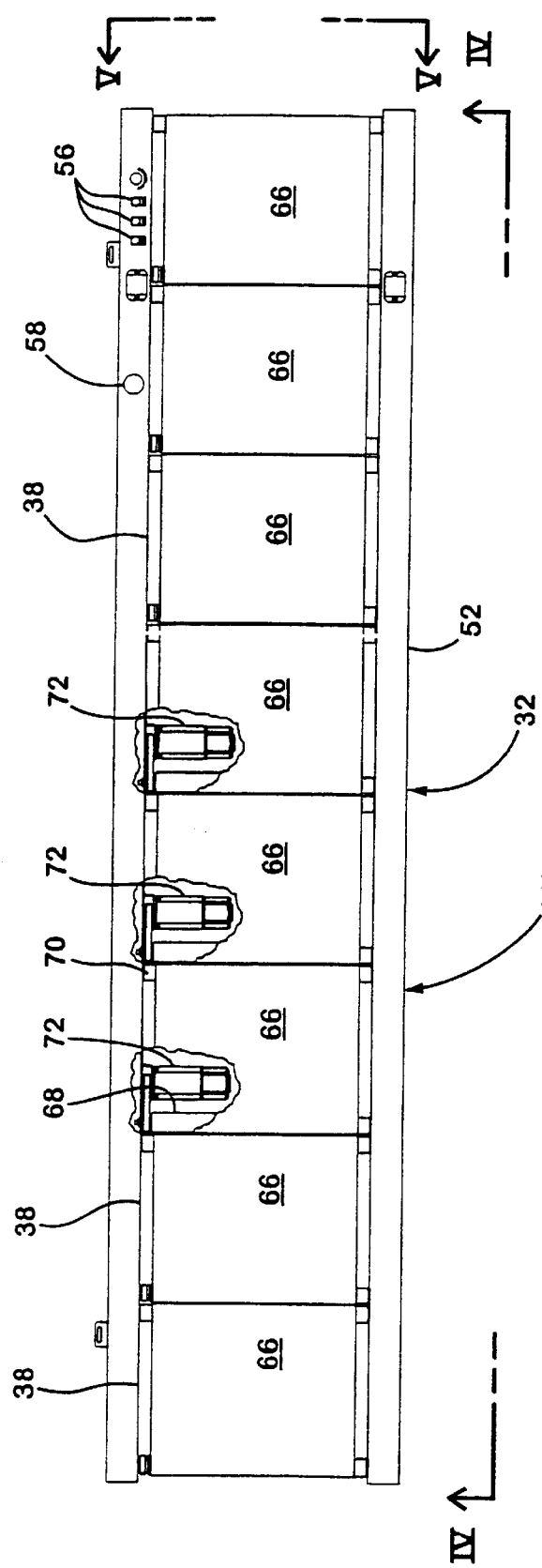
FIG. 3 is a top plan view of a single-line induction system, according to the invention.
Figure 4:
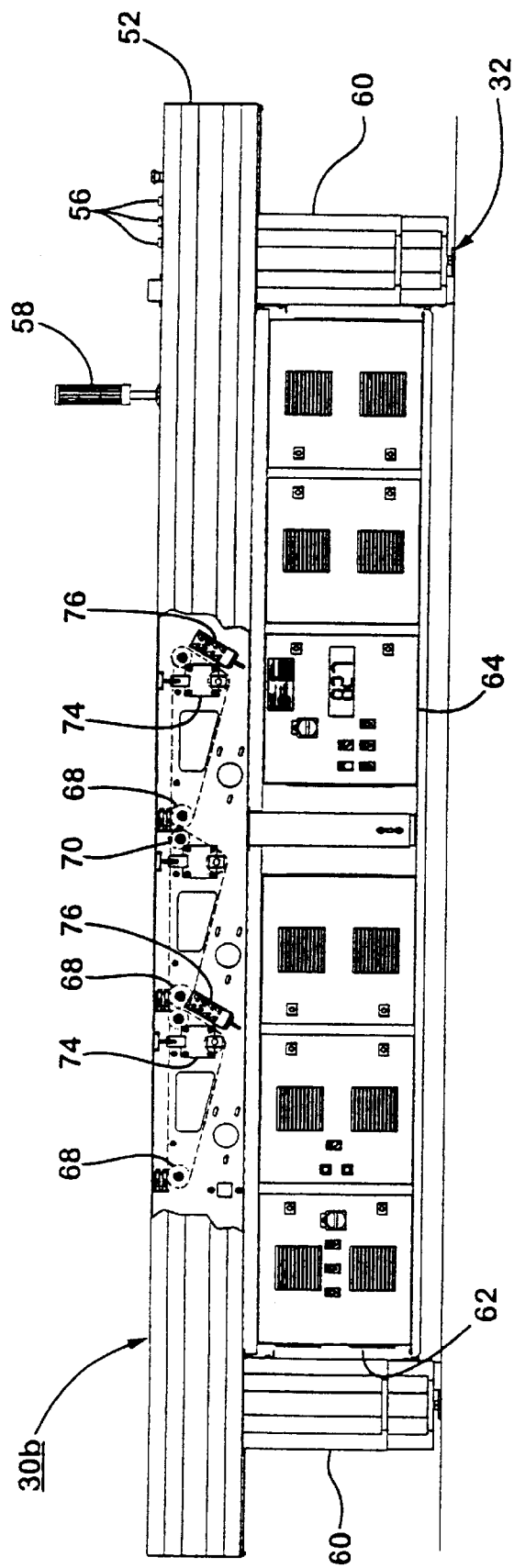
FIG. 4 is a side elevation taken from the direction IV—IV in FIG. 3.
Figure 5:
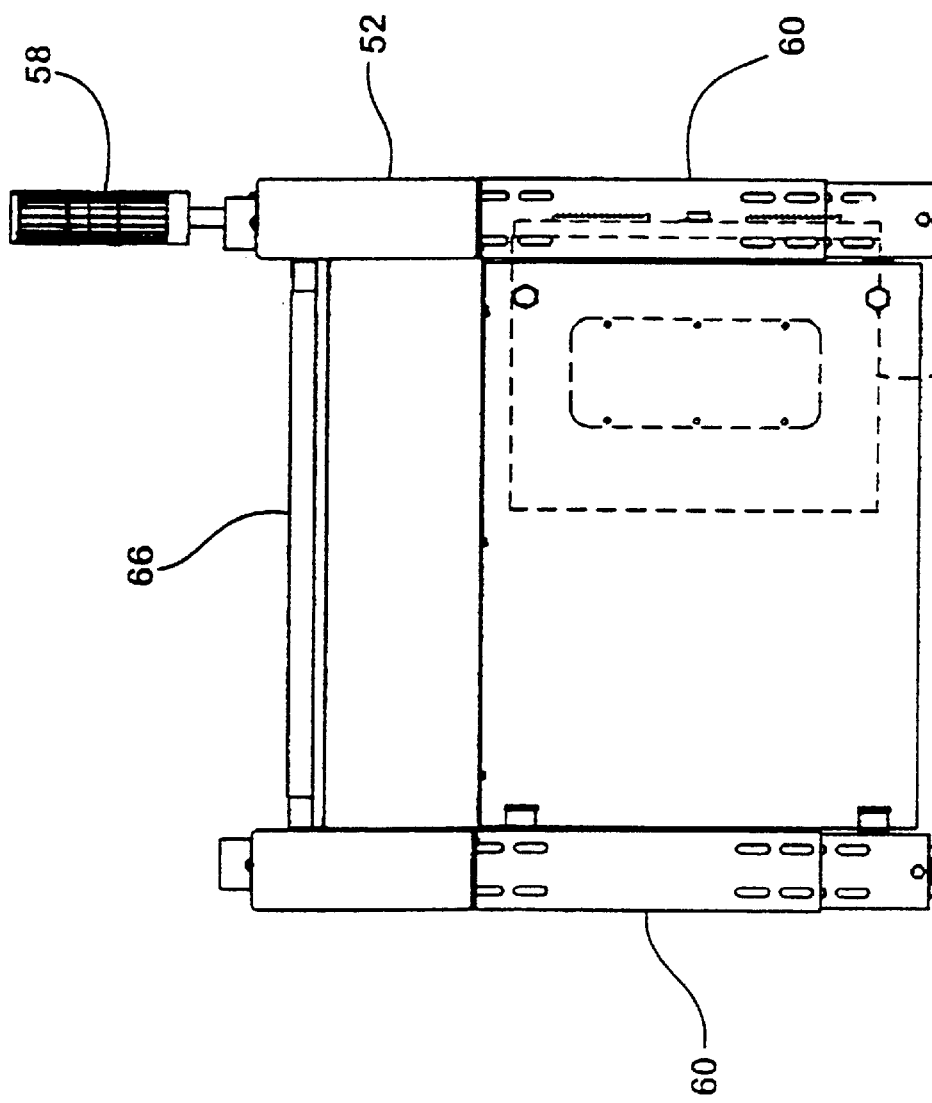
FIG. 5 is an end elevation taken from the direction V—V in FIG. 3.
Figure 6:
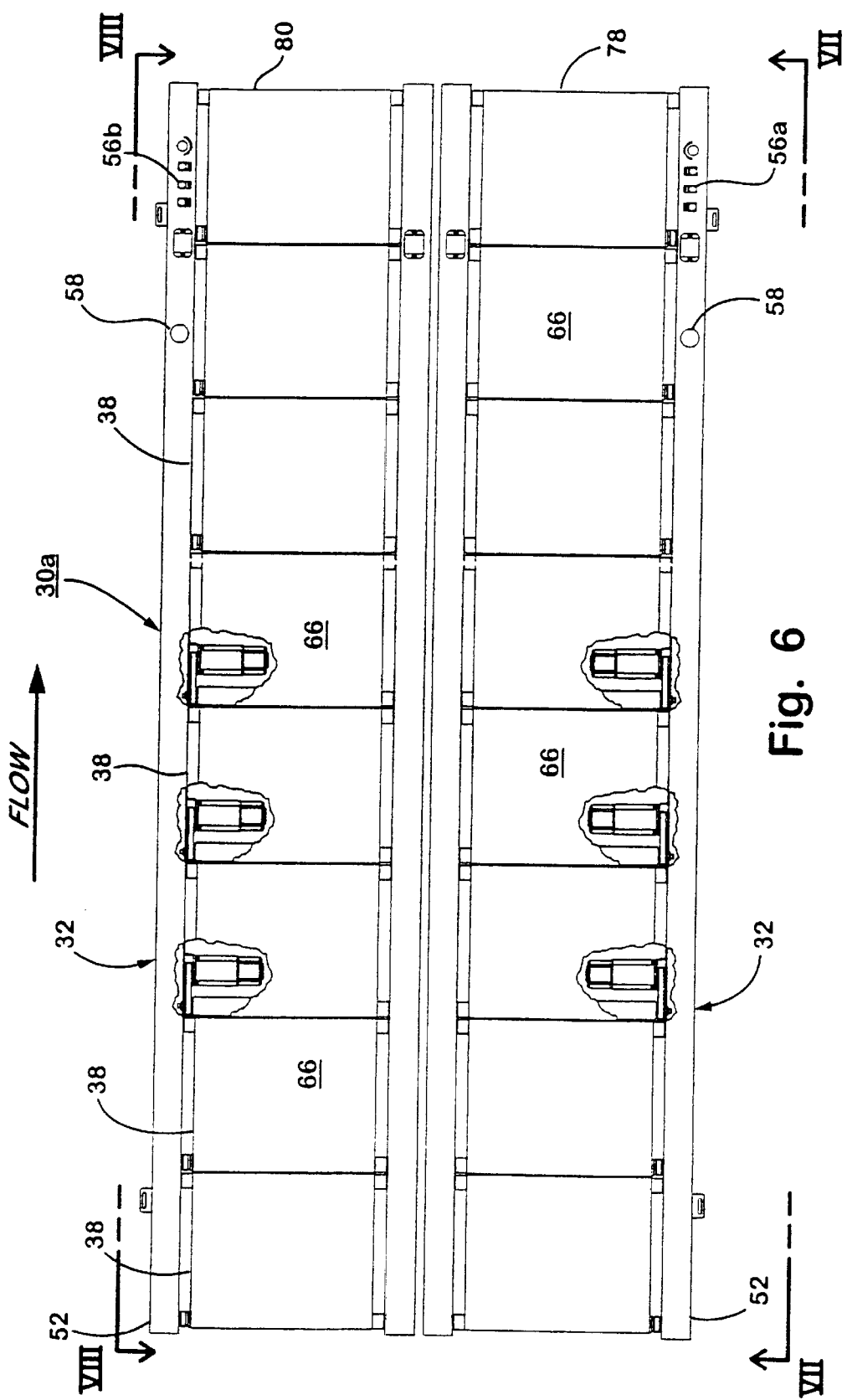
FIG. 6 is a top plan view of a multiple-line induction system, according to the invention.
Figure 7:
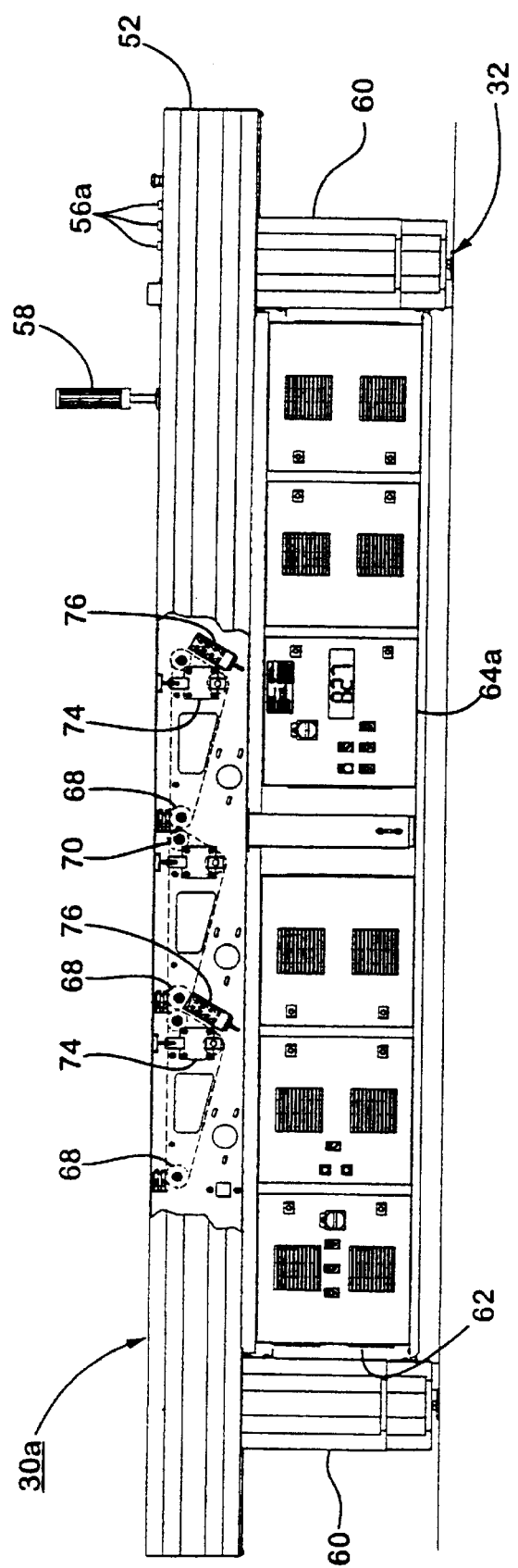
FIG. 7 is a side elevation taken from the direction VII—VII in FIG. 6.
Figure 8:
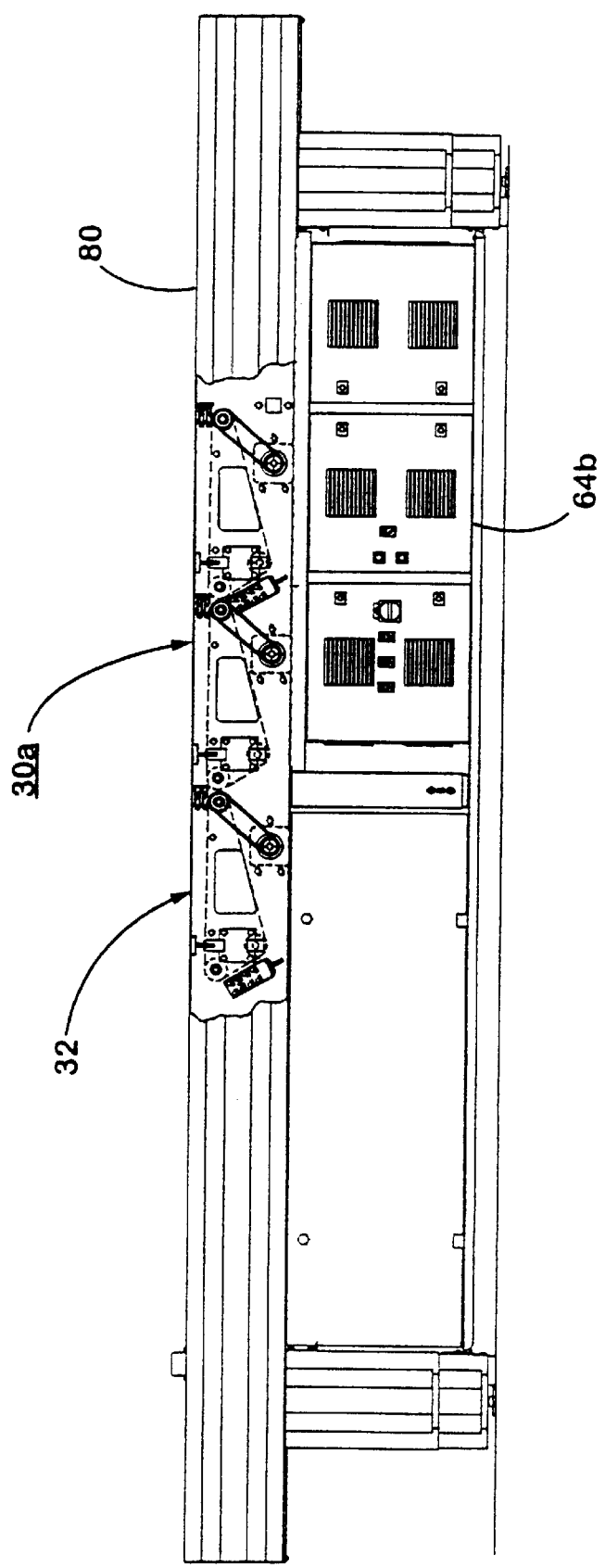
FIG. 8 is a side elevation taken from the direction VIII—VIII in FIG. 6.
Figure 9:
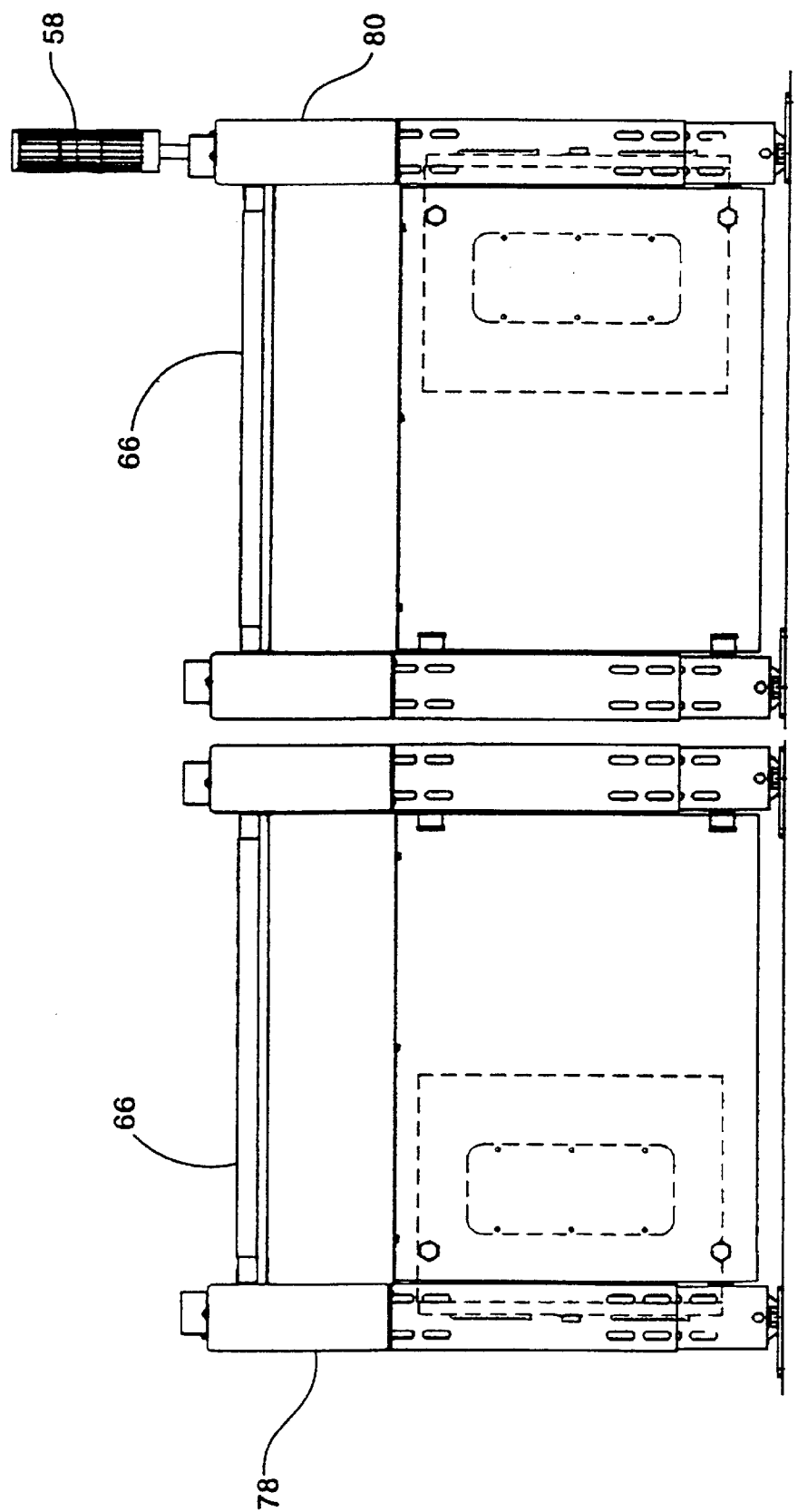
FIG. 9 is an end elevation taken from the direction IX—IX in FIG. 6.
Figure 13:
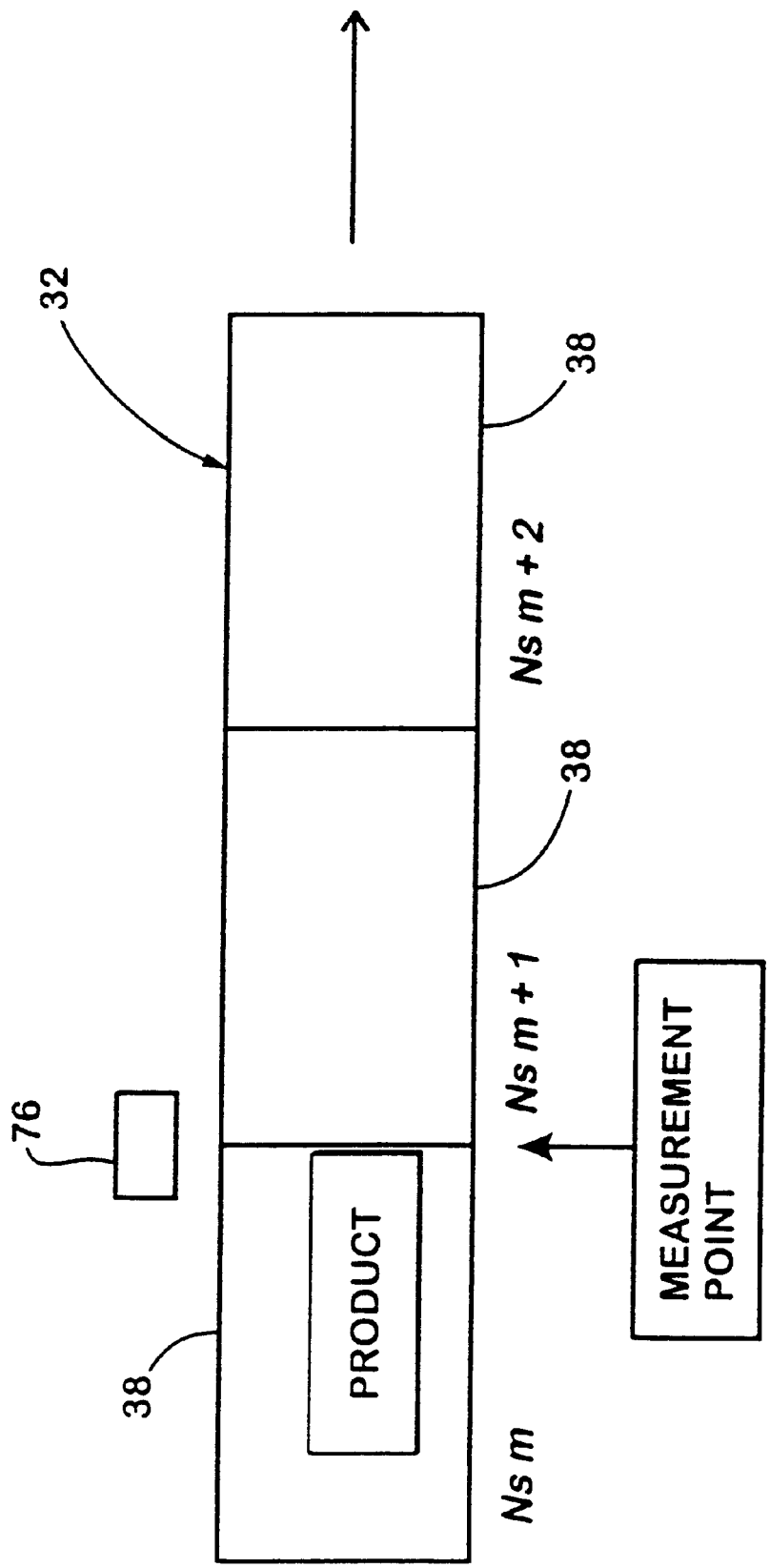
FIG. 13 is a diagrammatical representation of the upstream portion of an induction unit.

Induction system 30b, illustrated in FIGS. 3–5, is a single-line induction unit. A dual-line induction system 30a, illustrated in FIGS. 6–9, includes two induction units 32 which are substantially identical in mechanical construction to each other and to the induction unit in induction system 30b. However, a master unit 78 includes a master control 64a which includes the microcomputer for operating both master unit 78 and slave unit 80. Slave unit 80 includes a slave control 64b which includes control input devices 56b for controlling the operation of slave unit 80. It also includes the input and output circuitry for operating of the slave unit 80. However, as set forth above, the microcomputer is positioned in control 64a of master unit 78. Multiple-line induction system 30a includes a status indicator 58 which indicates the status of the induction units making up the induction system.

Each induction unit 32 receives product from a product source 46, which may be a belt conveyor, or the like, which may not have the capability for accumulation upstream of the induction system. The ability to eliminate upstream accumulation makes possible the use of an induction system with belt conveyors, which are capable of handling product that cannot be optimally handled by roller conveyors. However, it should be understood that the invention may be used with other types of product source, including roller conveyors and units incorporating 98 accumulation.

Each induction unit is logically divided into a series of conveying units designated 1–8 with the lower numbers towards the receiving end 34 and the higher numbers towards the discharge 36. In the illustrated embodiment, eight conveying units are utilized. However, the modular nature of the invention allows the number of conveying units to be greater than or less than eight conveying units depending upon the application. In the case of a single-line induction system 30b, the conveying units are designated A1–A8. In the case of a multiplying induction system 30b, the conveying units are designated A1–A8 for a primary line 83 and B1–B8 for a secondary line 85. As is conventional, the products discharged at discharge end 36 are mechanically merged at 42.

Continuous member 26 includes an encoder 82 which may generate pulses corresponding to movement of the continuous member. Each induction unit 32 is synchronized with the continuous member 26 such that product may be booked to positions on continuous member 26, which preferably corresponds with individual pusher shoes or carriers 50. This is accomplished by establishing synchronization at an upstream one of the conveying units and establishing synchronization as the product is adjusted to coincide substantially with the booked position of continuous member 26. In the illustrative embodiment, synchronization occurs as early as the second conveying unit A2, B2 and preferably no later than the third conveying unit A3, B3.

A photo-eye 76 is placed at the upstream end of each conveying unit 38. The photo-eye of the second conveying unit is used to detect the length of the product. An additional photo-eye is positioned at the discharge end 46 in order to inform the merge section 42 about the movement of the product being discharged from the induction unit. Product source 46 has a speed that is slower than the speed of continuous member 26 in order to obtain a gap between the product during the transition from the product source to the upstream conveying unit A1, B1. The upstream conveying unit A1, B1 has a constant speed in order to produce a gap between product. The second upstream conveying unit A2, B2 has a speed equal to conveying unit A1, B1 during the transfer phase between A1, B1 to A2, B2 in order to provide a correct measurement of the product length. Conveying units A3, B3 through A8, B8 all have belts with nominal speeds that are substantially equal to the speed of continuous member 26. All of the conveying units are speed closed-loop-regulated to obtain correct loading and synchronization with the booked position of the continuous member. Because the speed of continuous member 26 may change during the sortation process, as a result of jams, excessive loading, and the like, the target speeds of the conveying units making up the induction unit 32 may change in order to accommodate the changes in speed of the continuous member. In particular, at least one induction unit in the induction system follows the speed of continuous member 26. The induction unit starts substantially as soon as the continuous member is moving and decreases in speed only when the continuous member decreases in speed. In the case of a multiple induct system, the other induction unit may be capable of decreasing in speed irrespective of the speed of the continuous member.

After a product has been accelerated on conveying unit A1, B1 to draw a gap and the product is measured as to position and length as it moves onto conveying unit A2, B2, a position on continuous member 26, 26' is booked for that product. In the case of a linear sorter, as illustrated in FIG. 1, the product is booked with respect to a logical cell, which preferably is the leading edge of one of the pusher shoes on the continuous member 26. Because of the nature of the sorter, there is no product recirculating around the continuous member. Therefore, the position on the continuous member, or logical cell, is booked to the next available pusher shoe, taking into account any gap necessary between product on the sorter. In the case of a carousel-type sorter 25', the product is booked to a carrier 50 which should be available by the time that carrier reaches the induct unit. As previously set forth, the control is capable of booking to a carrier which is presently carrying a product, if that product is to be discharged prior to reaching the induct system. If the product cannot be inducted to a carrier after that carrier is booked, such as where the carrier is carrying a product at the induct due to the destination being full, or the like, the booking is cancelled and a new booking is made for that product.

Once a booking is made for a product on a conveying unit close to the product source, the remaining conveying units are used to adjust the position of that product to that of the logical cell, or carrier, to which the product is booked. This is possible because of the encoder 82 and the speed closed-loop regulation of the conveying units which allow the necessary adjustments to the product in order to be discharged to the continuous unit 26, 26' in a manner to be positioned at the logical cell or carrier booked for that product.

Advantageously, the regulation scheme of conveying units 38 allow the inducting of product having a length that is greater than the length of any of the belts 66 of the conveying units 38. This increases the range of product that may be handled by the induction system.

Figure 14:
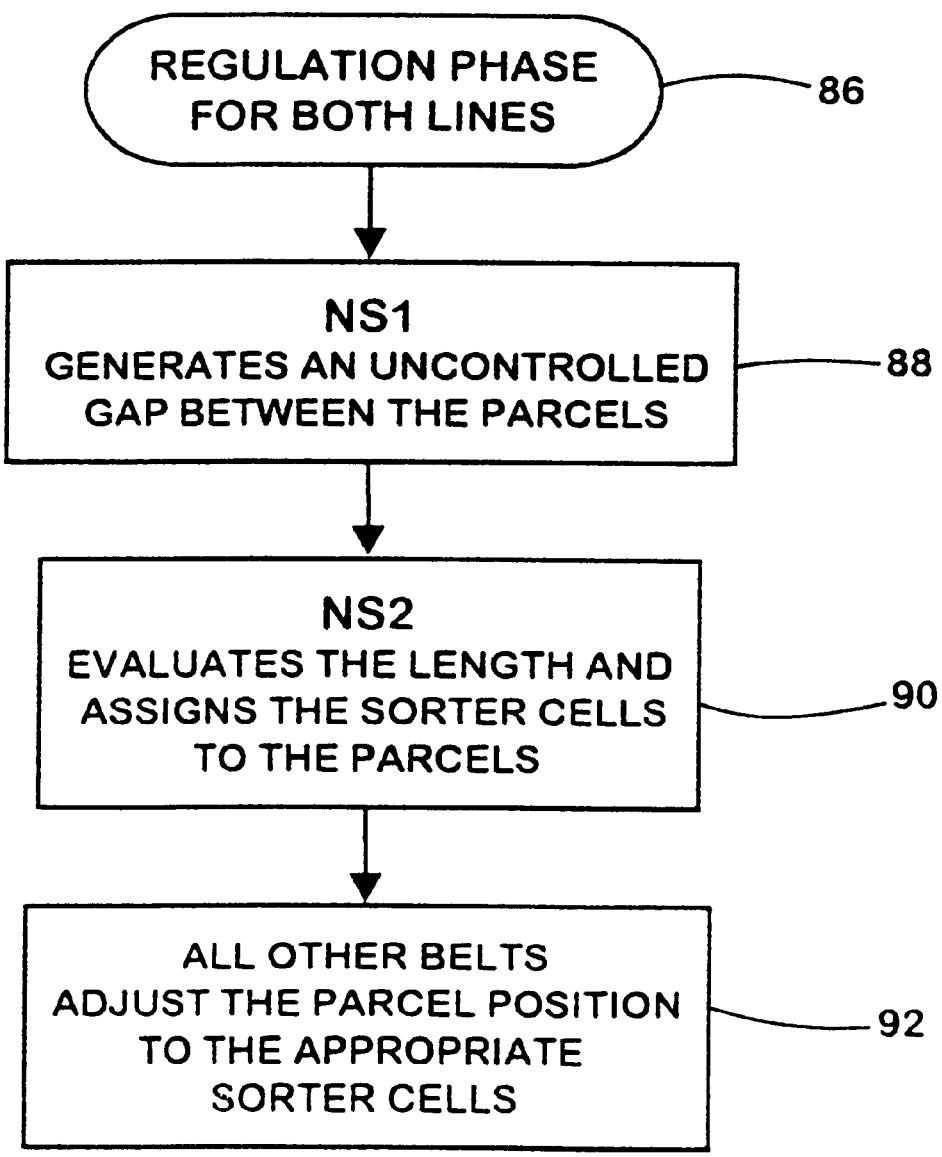
FIG. 14 is a flowchart of a regulation phase of a belt-moving strategy.

In order to induct product, induction system 30, 30a, 30b carries out an induction process 84 (FIG. 14). Induction process 84 begins at 86 when the induction unit, or all induction units in the case of a multiple-line induction system, are in a regulation phase. The process includes generating an uncontrolled gap between the product, and parcels, on the upstream-most conveying unit A1, B1. The control then evaluates the length of the product, or parcel, (90) at the next downstream A2, B2 and books the logical cell or carrier for that product or parcel. The remaining conveying units A3, B3 through A8, B8 adjust the parcel position to the appropriate logical cell or carrier booked for that product (92).

Figure 15:
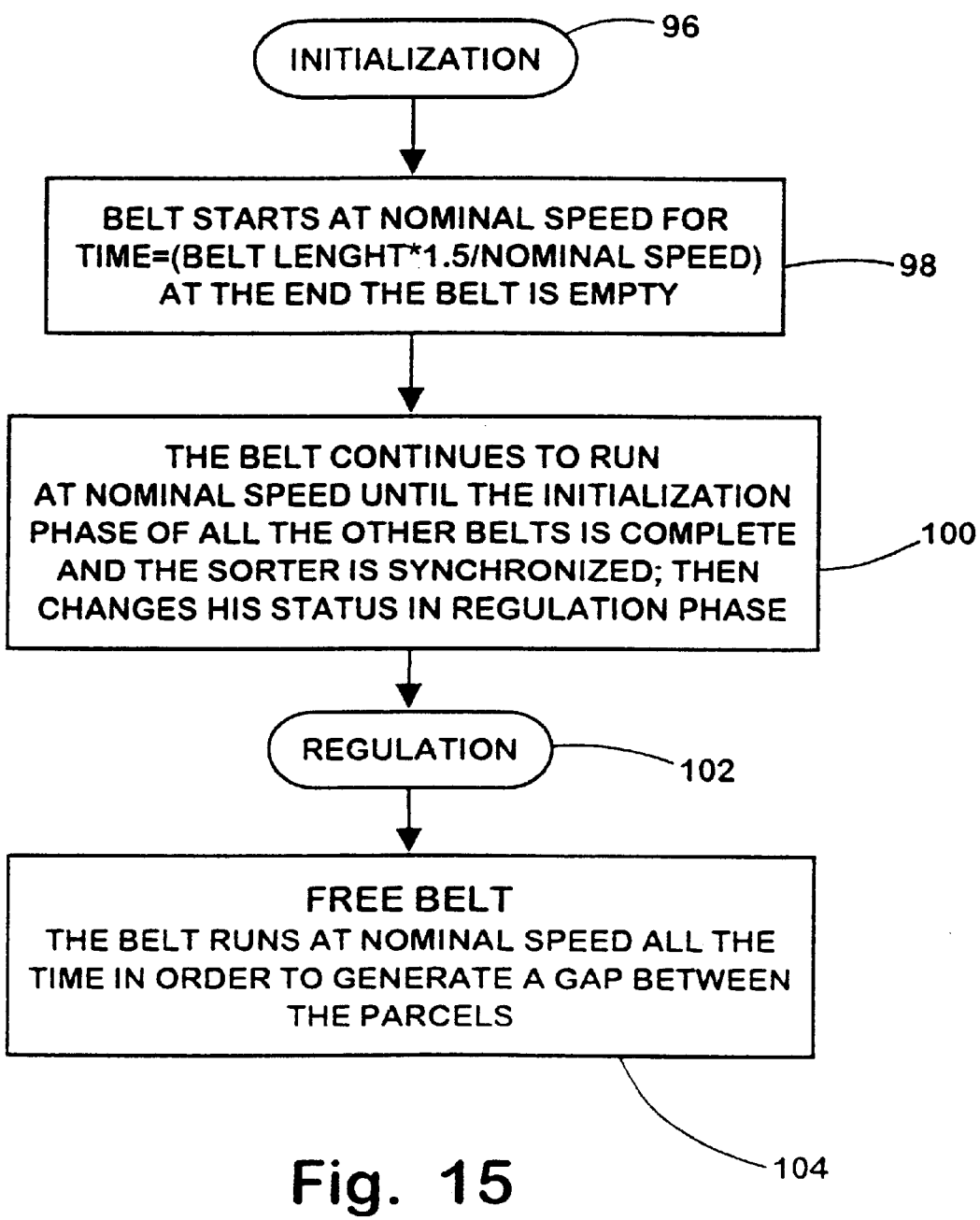
FIG. 15 is a flowchart of a transition state for the upstream-most conveying unit.

Regulation of the upstream-most belt A1, B1 is achieved according to a control procedure 94 (FIG. 15). Control procedure 94 begins by an initialization 96 at which the belt 66 is operated at its nominal speed for a period of time. The time period is defined as 1.5 times the length of the belt divided by the nominal speed (98). At the end of this time, the belt should be empty of product. The belt then continues to run at the nominal speed until the initialization phase of all of the other downstream belts is complete and the sorter is synchronized (100). Initialization is then complete, and the status of the conveying unit A1, B1 is changed to the regulation phase 102. Upon entering regulation phase 102, the belt runs at nominal speed in order to generate an unregulated gap between articles or parcels (104).

Figure 16:
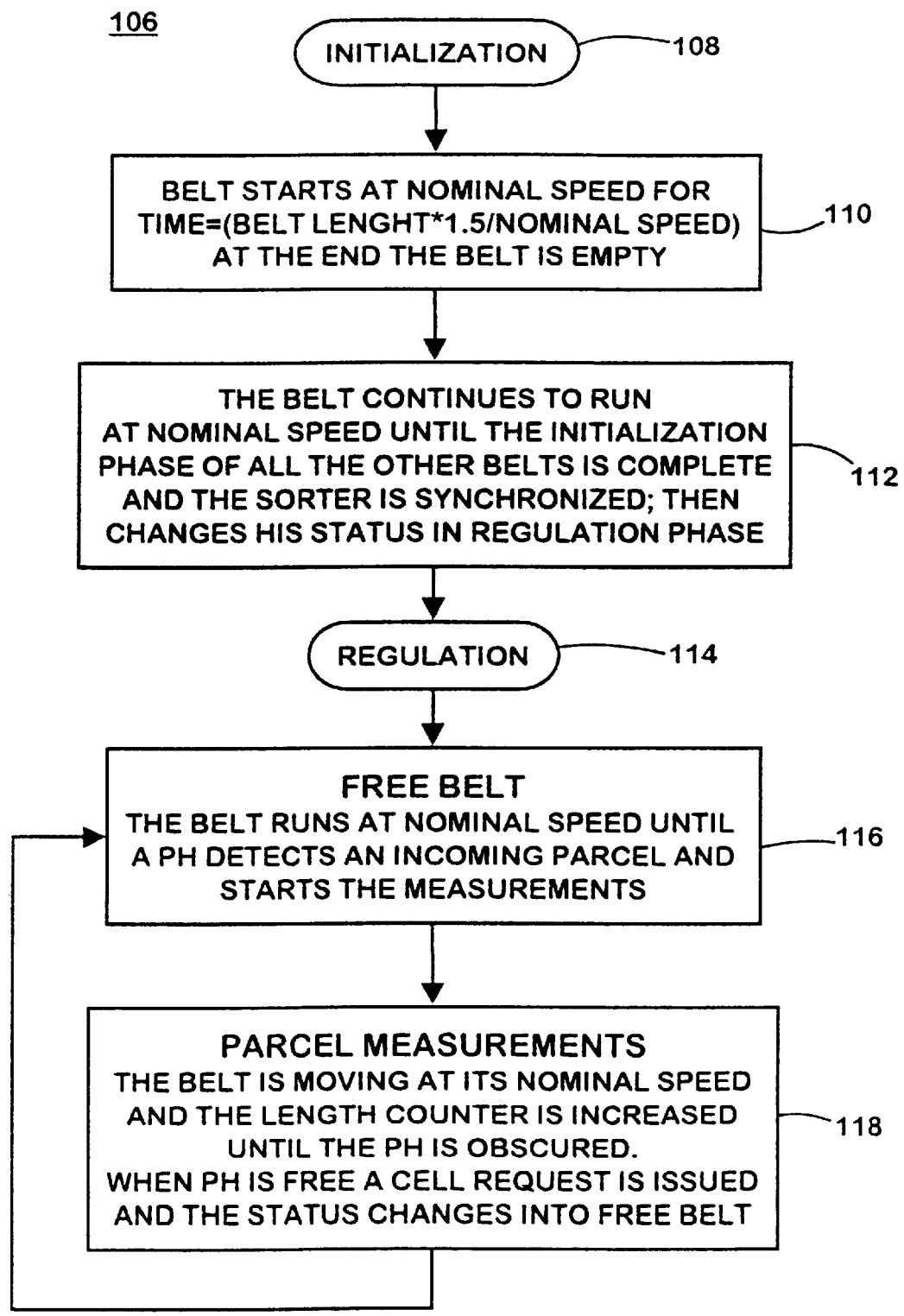
FIG. 16 is a flowchart of a transition state for the second conveying unit from the product input.

For the next downstream conveying unit A2, B2, a control procedure 106 (FIG. 16) begins with initialization at 108, at which time the belt is operated at nominal speed for a time period that is defined as 1.5 times the belt length divided by its nominal speed (110). At the end of this period, the belt should be empty. The belt continues to run at nominal speed until the initialization phase of all of the other belts is complete and the sorter is synchronized (112). The status of the conveying unit is changed to the regulation phase at 114, and the belt runs at nominal speed until a photo-eye detects an incoming product and starts measurement of the length and/or position of the product (116). Parcel, or product, measurement is carried out at 118 by the belt moving at its nominal speed with the position encoder being incremented until the photo-eye is obscured. When the photo-eye is no longer obscured, the control is able to determine the length and/or position of the parcel and a request for a logical cell or carrier is issued. The status of the belt changes to that of a free belt (116).

Figure 17:
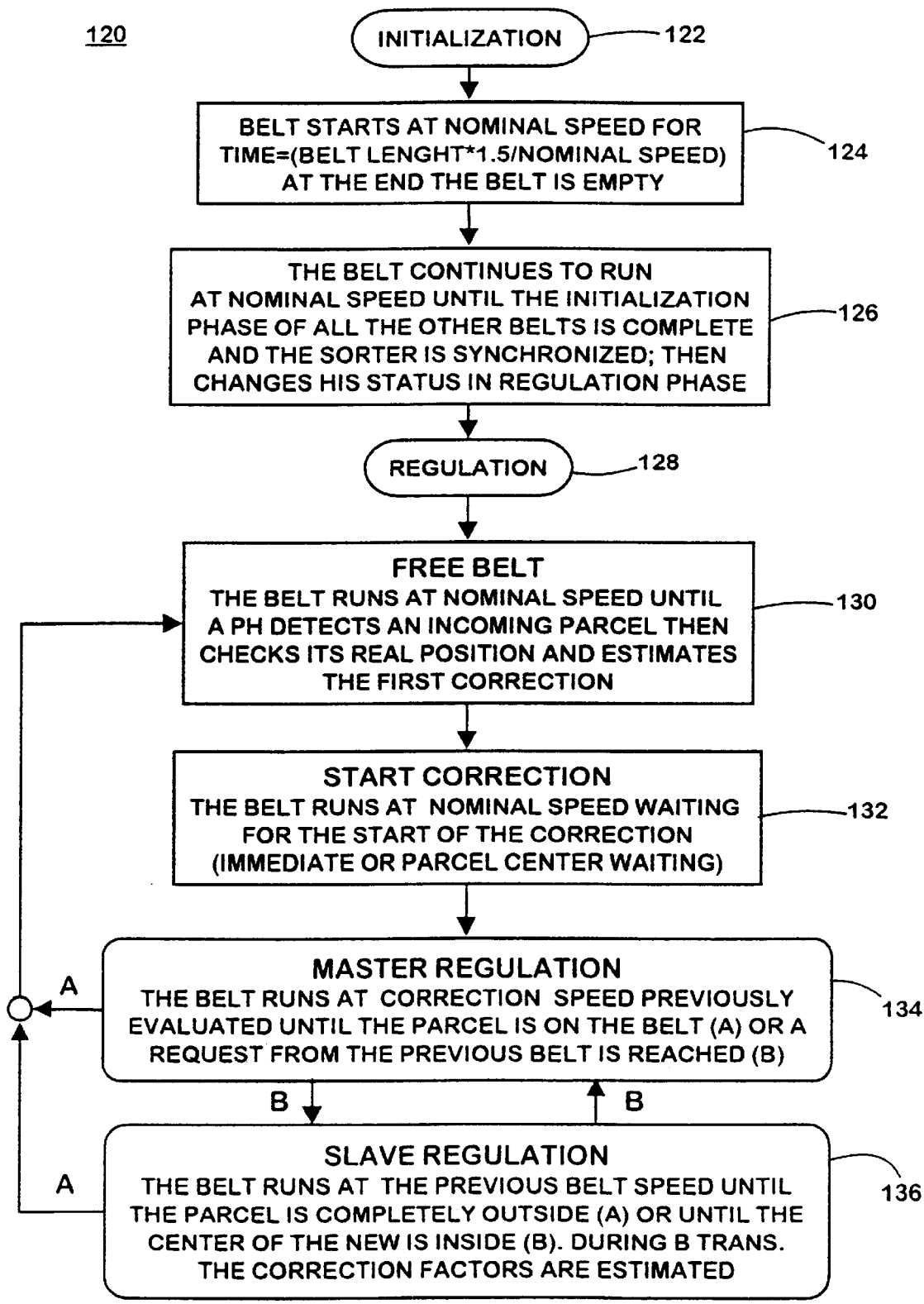
FIG. 17 is a flowchart of a transition state diagram for the conveying units between the second from the product input and the second from the closest to the product output.

A control routine 120 for the remaining conveying units A3, B3 through A7, B7 is illustrated at 120 (FIG. 17). The control procedure begins at initialization 122, wherein the corresponding belt starts at its nominal speed for a period of time defined as 1.5 times the belt length divided by nominal speed (124). At the end of this time period, the belt should be empty and continues to run at nominal speed until the initialization phase of all of the other belts is complete and the sorter is synchronized (126). The status of the corresponding belt is changed to the regulation phase at 128. The belt runs at nominal speed until a photo-eye detects an incoming product, or parcel, checks its position and calculates a first correction (130) to position the product at the booked logical cell or carrier for that product on the continuous member. The belt runs at nominal speed waiting for the start of the correction to begin at 132. The correction begins when the center of the parcel arrives on that conveying unit. The conveying unit then goes through a master regulation (134) and a slave regulation (136). During master regulation, the parcel is translated onto the conveying unit. The conveying unit is deemed to have received the parcel when the corresponding photo-eye is blocked. During the slave regulation phase, the conveying unit assists the previous upstream conveying unit. The center of gravity of the parcel, or product, may still be on the downstream belt, but the parcel is still considered to be in transit. During the master regulation, the speed of the conveying unit is adjusted according to the position required and the parcel length. During slave regulation, the belt moves at the same speed of the previous upstream belt that is adjusting the parcel position. Master regulation begins when the parcel is incoming without waiting for the center of the parcel to arrive. From the slave regulation, the system goes to master regulation when a new product leaves the conveying unit, the conveying unit returns to nominal speed.

Referring to FIG. 17, during master regulation, the belt runs at the speed required to implement the correction calculated at 130. This is carried out until the center of gravity of the parcel or product, is on the conveying unit or until a request from the closest upstream-most belt is received. When a request from the closest upstream belt is received, the slave regulation routine 136 causes the belt to run at the speed of the previous upstream belt until the parcel is completely off of the upstream conveying unit or until the center of gravity of the product is on the controlled conveying unit. While the controlled unit is in slave regulation, the correction is again estimated.

Figure 18:
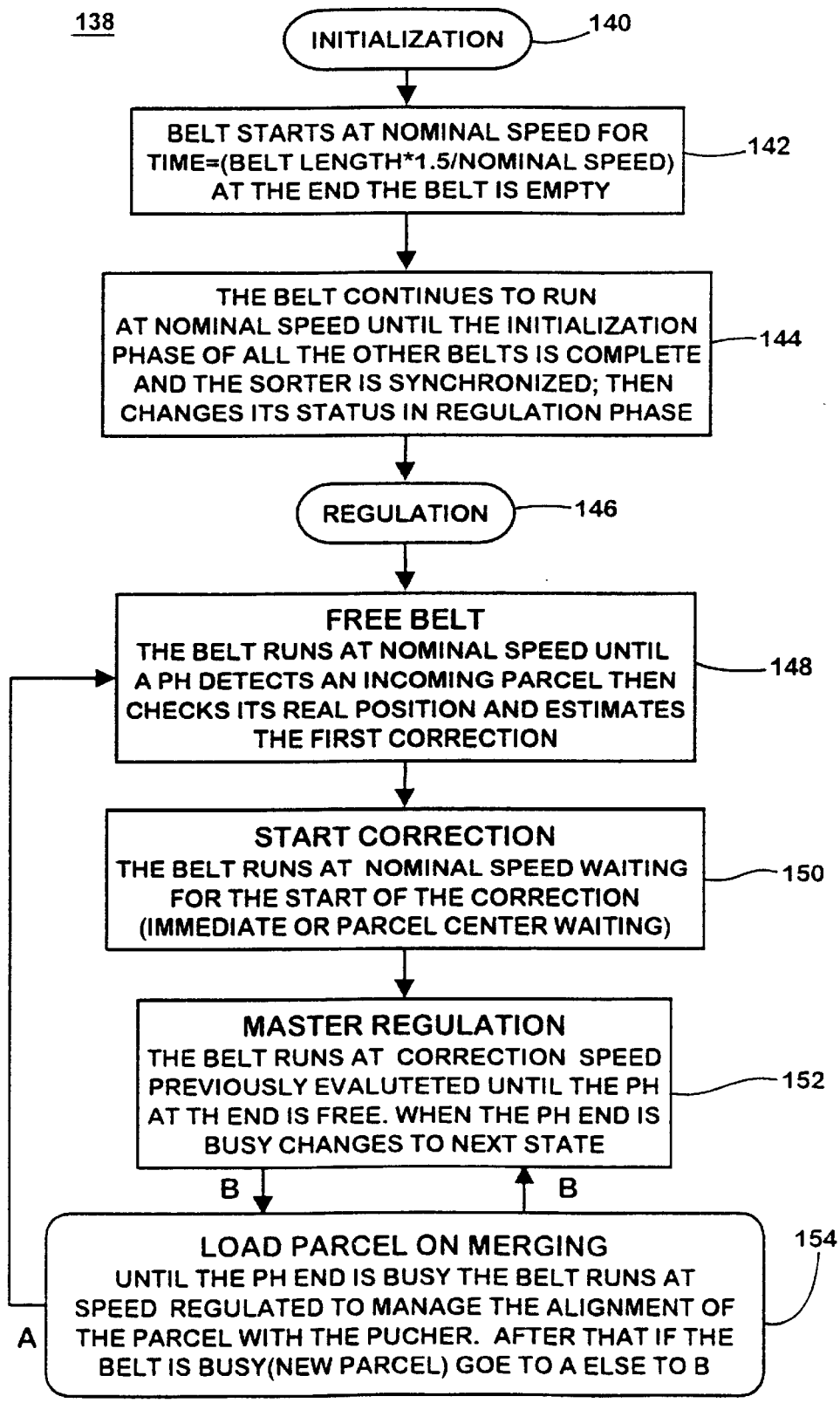
FIG. 18 is a flowchart of a transition state diagram of the conveying unit closest to product output.

When the product reaches the last conveying unit A8, B8, a control procedure 138 is performed (FIG. 18). The procedure begins with initialization at 140, at which time the belt of the last conveying unit A8, B8 is operated at nominal speed for a period of time defined as 1.5 times the belt length divided by nominal speed (142). At the end of this time period, the belt is considered empty. The belt continues to run at nominal speed (144) until the initialization phase of all of the other belts is complete and the sorter is synchronized. The status of this belt is changed to the regulation phase at 146. The belt runs at nominal speed at 148 until a photo-eye detects that an incoming product is received. The conveying unit A8, B8 checks the position of the product and estimates a correction to discharge the product to the booked logical cell or carrier. During a start correction phase 150, the belt runs at nominal speed waiting for the start of the correction. During master regulation (152), the belt runs at the calculated correction speed until the photo-eye of the discharge end 36 is unblocked. When the photo-eye is blocked, a load parcel on merging routine 154 is performed. When the photo-eye is blocked, the belt runs at a speed that is controlled to manage alignment of the parcel with the booked pusher, logical cell, or, in the case of a carousel sorter, the booked carrier. After that, if a new parcel is detected, the control returns to a free belt (148) status. Otherwise, the belt returns to the master regulation (152) status.

Figure 19:
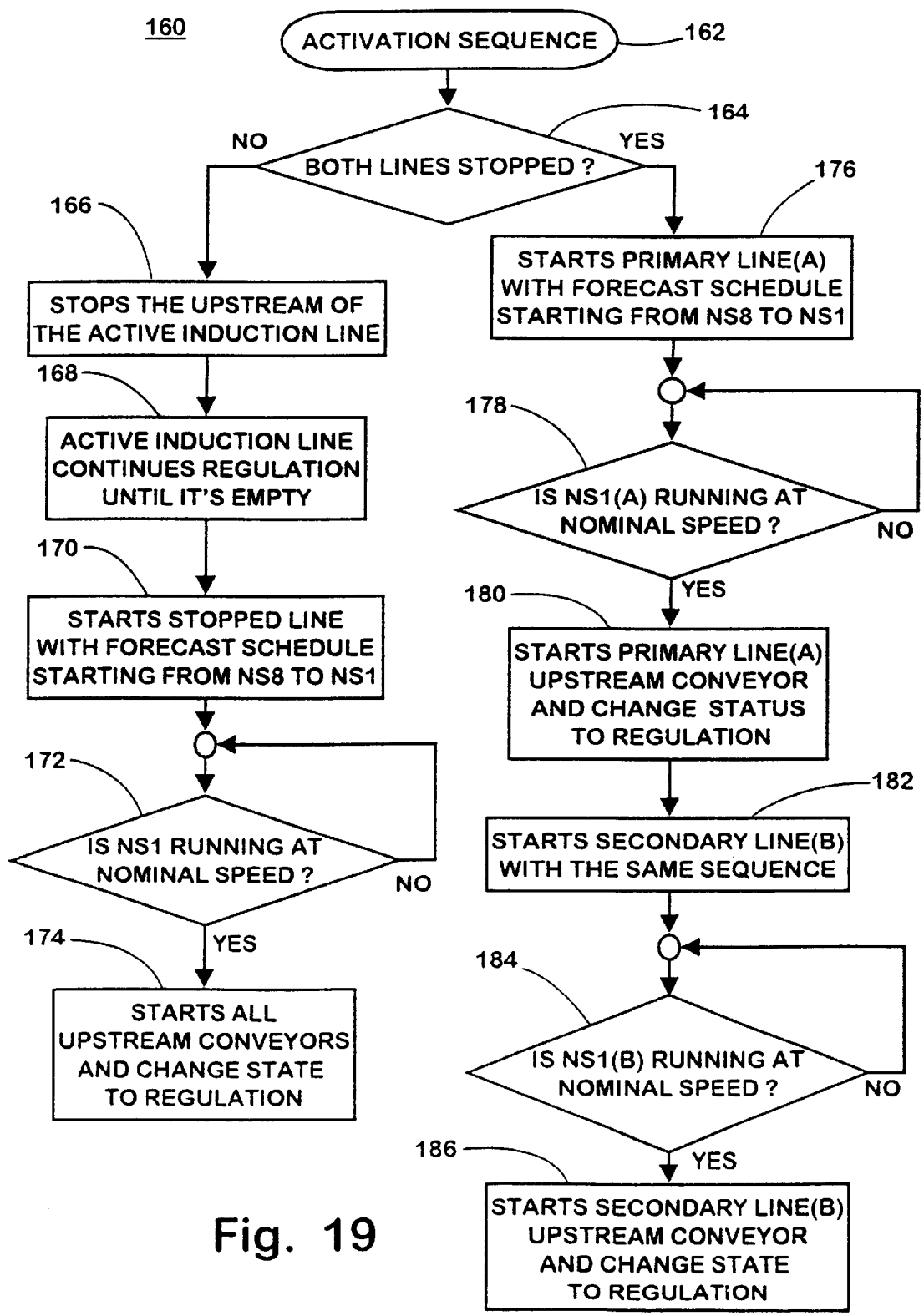
FIG. 19 is a flowchart of an activation sequence function.

If one or both induction units, or lines, are stopped, an activation sequence 160 is carried out (FIG. 19). When the activation sequence is initiated at 162, it is determined at 164 whether both lines are stopped. If both lines are not stopped, the product source 46 of the active induction unit is stopped at 166. The active induction unit continues to induct product to the continuous member until the induction unit is empty (168). The line that is stopped is started at 170 with the individual conveying units 38 being started according to a schedule. It is then determined at 172 whether the upstream-most conveying unit A1, B1 is running at nominal speed. When conveying unit A1, B1 is running at nominal speed, the remaining conveying units are started and processed to the regulation phase at 174.

If it is determined at 164 that both lines are stopped, primary line 83 is started at 176 utilizing a schedule for starting the units. When it is determined at 178 that the upstream-most conveying unit A1 is running at nominal speed, the remaining conveying units are started at 180 and processed to the regulation phase. Then secondary line 85 is started utilizing the same sequence at 182. It is then determined at 184 whether the upstream-most conveying unit B1 is running at nominal speed. When it is, the remaining conveying units for the secondary line are started and processed to the regulation phase at 186.

Induction system 30, 30a, 30b includes a mode defined as "stop not allowed." When primary line 83 of multiple-line induct 30a is configured as "stop not allowed," the corresponding induction unit starts as soon as the continuous member is moving. When in such "stop not allowed" mode, the primary line stops only when the continuous member is stopped. As such, the primary line in the "stop not allowed" mode follows the motion of the continuous member, receiving product from the product source and moving the product on the continuous member with a sufficient gap with a downstream product. In the case where product cannot be placed on the continuous member with the correct gap, the adjustment to the belt speeds will be suspended and one or more items will be loaded to the continuous member without the correct gap. Preferably, the items loaded to the continuous member without the correct gap will be sent to recirculation line 44.

Figure 20:
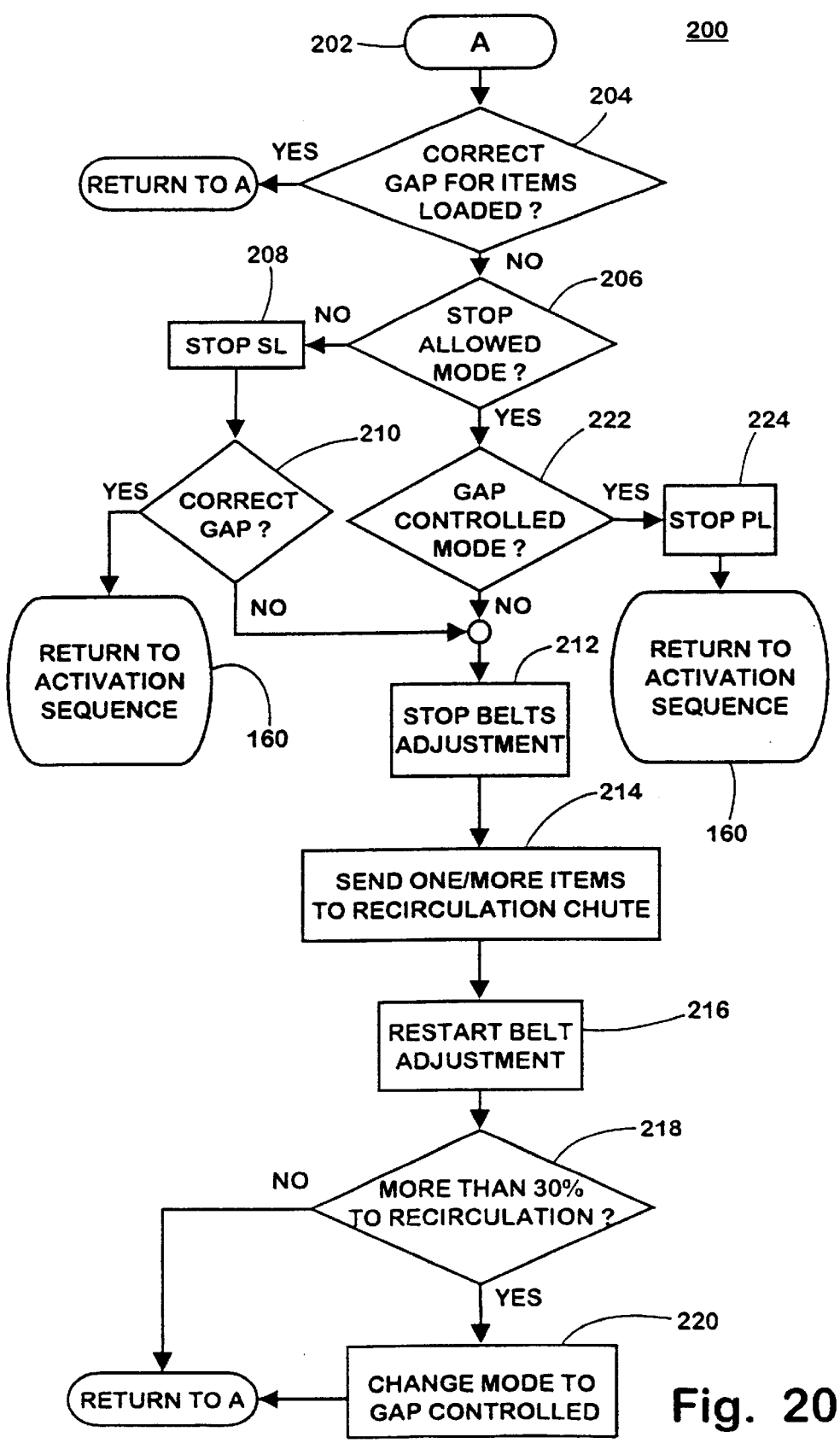
FIG. 20 is a flowchart of a line synchronization function for a primary induction line.
Figure 21:
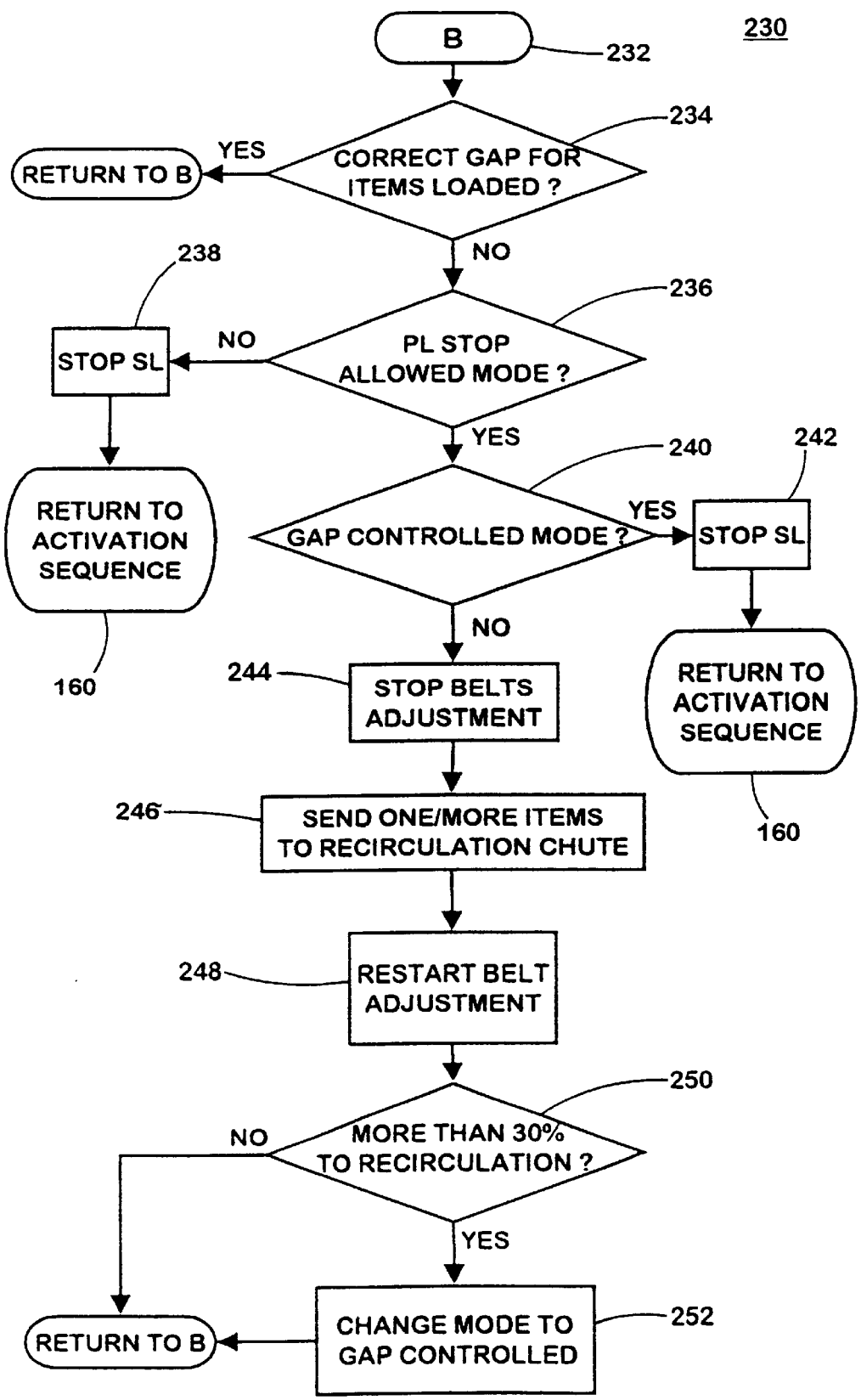
FIG. 21 is a flowchart of a line synchronization function for a secondary induction line.

A control routine 200 for the primary line 83 begins at 202 by determining at 204 whether a correct gap can be established for items being loaded to the induction of the primary line (FIG. 20). If it is determined at 204 that correct gaps can be established, the control returns to 202 where an ongoing inquiry is made whether correct gaps can be established. When it is determined at 204 that a correct gap cannot be established for product being loaded to the induction unit, a determination is made at 206 whether the primary line is in the "stop not allowed" mode. If it is determined at 206 that the primary line is in the "stop not allowed" mode, the secondary line is stopped at 208 and a determination is made at 210 whether, with the secondary line stopped, it is possible to achieve a correct gap for product discharged to the continuous member. If it is determined at 210 that a correct gap can be achieved, the control returns to activation sequence 160 in order to restart the secondary line.

If it is determined at 210 that a correct gap cannot be achieved with the secondary line stopped, control proceeds to 212 where the conveying units are operated at nominal speed without an attempt to adjust the belts for achieving proper gap. The control then sends one or more products to the recirculation line at 214 and restarts belt adjustments at 216.

The control then determines at 218 whether more than a particular percentage of the product is in recirculation. Because product discharged in a continuous member without adequate gap is sent to recirculation and the recirculation returns the product to the induction unit, it is possible for the number of products that cannot be adequately gapped to increase in the sortation system. When it is determined at 218 that more than a particular percentage of the product is in recirculation, the mode of the primary line is changed at 220. In particular, the "stop not allowed" mode is changed to "stop allowed" and the "gap not controlled" mode is changed to "gap-controlled." If it is determined at 218 that the percentage of product in recirculation is less than the given percentage, control returns to 202. In the illustrated embodiment, the given percentage in recirculation is 30 percent, but greater or lesser percentages may be utilized.

When it is determined at 206 that the primary line is in the "stop allowed" mode, it is determined at 222 whether the primary line is in a "gap controlled" mode. If the primary line is in a "stop allowed" mode, but not in a "gap controlled" mode, control proceeds to 212 where belt adjustments are suspended and items that cannot be properly gapped are sent to recirculation. If it is determined at 222 that the primary line is in the "gap controlled" mode, the primary line is stopped at 224 for items that cannot be properly gapped. Activation sequence 160 is performed in order to return the primary line to regulation status.

A control routine 230 for controlling the secondary line 85 begins at 232 by determining at 234 whether a correct gap can be achieved for items loaded to the induction unit making up the secondary line. If so, control returns to 232 where the system continues to repeatedly check for correct gaps. When it is determined at 234 that a correct gap cannot be achieved for the items being loaded to the induction unit, it is determined at 236 whether the primary line is in the "stop allowed" mode. If it is determined that the primary line is in the "stop not allowed" mode, the secondary line is stopped at 238 and activation sequence is performed at 160 in order to bring the secondary line to regulation status.

If it is determined at 236 that the primary line is in the "stop allowed" mode, it is determined at 240 whether the system is in a "gap controlled" mode. If it is determined at 240 that the system is in a "gap controlled" mode, the secondary line is stopped at 242 in order to avoid discharging an improperly gapped product to the continuous member. Activation sequence is then performed at 160 in order to bring the secondary line to regulation status.

If it is determined at 240 that the system is not in the "gap controlled" mode, belt adjustments are suspended at 244 and any improperly gapped items are sent to the recirculation line at 246. Belt adjustment is restarted at 248, and it is determined at 250 whether more than a given percentage of product is in recirculation. If it is determined at 250 that more than the given percentage of product is in recirculation, the induction system is changed to the "gap controlled" mode at 252. If it is determined at 250 that less than the given percentage of product is in recirculation, the control returns to 232.

The result is that if the primary line is configured as "stop allowed" and in the "gap controlled" mode, the line must always place the product on the continuous member system with the correct gap. If the gap cannot be reached, the primary line and the relevant upstream conveyor will stop. If the primary line is in the "stop not allowed" mode and in the "no gap" mode, it is necessary to avoid stopping the primary line, if possible. In case items cannot be placed on the continuous member with the correct gap, the belt adjustments will be suspended and one or more items will be loaded without the correct gap and sent to the recirculating line. The system will automatically change the mode of working from "no gap" to "gap controlled" if more than the pre-selected percentage of items is sent to the recirculating line.

The secondary line also includes two modes of working when the primary line is in the "stop allowed" mode. In the "gap controlled" mode, the secondary line must always place the items on the continuous member with the correct gap. If the gap cannot be reached, the secondary line and the relevant upstream conveyor will stop. In the "no gap" mode, it is necessary to avoid stopping the secondary line, if possible. In case items cannot be placed on the continuous member with the correct gap, the belt adjustments will be suspended and one or more items will be loaded without the correct gap and sent to the recirculating line. The system will automatically change the mode of working from "no gap" to "gap controlled" if more than the selected percentage of items is sent to the recirculating line. In any case, the secondary line must stop if the primary line is configured as "stop not allowed" and for some reason it is not possible to load items on the continuous member with a minimum configurable gap.

The present invention thus is capable of providing a priority lane for which the product is handled in a fashion which gives priority to product supplied to that lane over product supplied to other lane or lanes. This is desirable, for example, if a deadline in handling product for one lane is approaching or if product on one lane must be handled in a short period of time. The present patent discloses an induction system which is capable of tracking the speed of the sorter and provides synchronization with the sorter during restarting of the sorter after the sorter has been shutdown. This, advantageously, obviates the necessity for accumulation upstream of the induction system as well as in a re-circulation line for re-circulating product that s not adequately gapped.

The conveying surface of the conveying units making up the induction units operate in a manner which reduces the slowing of product on the induct, over those of the prior art, and pushes any such slowing further upstream on the induction unit. Advantageous, product can be inducted having lengths that exceed the lengths of the conveying units of the induct.

The present invention also provides an induct unit mechanized structure which is both compact and easy to maintain. Furthermore, a multiple line induct can be controlled in a master/slave fashion with a single computer controlling operation of multiple lines.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A sortation system, comprising:

a sorter including a continuous member defining a plurality of transport positions of said continuous member;

a plurality of sort destinations for receiving product discharged from said continuous member; and an induction system comprising at least one induction unit having a receiving end for receiving product from a product source and a discharge end for discharging product to said continuous member, said at least one induction unit including a plurality of tandem conveying units between said receiving end and said discharge end and a control controlling said conveying units;

said conveying units having nominal speeds;

said control having a mode, when said control is in said mode, said nominal speeds of said conveying units follow a speed of said continuous member including starting substantially as soon as said continuous member is moving and decreasing in speed substantially only when said continuous member decreases in seed.

2. The sortation system in claim 1 wherein said at least one induction unit comprises at least two induction units, each of said induction units discharging product to said continuous member.

3. The sortation system in claim 2 wherein said nominal speeds of said conveying units of at least one of said at least two induction units stat substantially as soon as said continuous member is moving and decrease in speed substantially only when said continuous member decreases in speed and wherein another of said at least two induction units is capable of decreasing in speed irrespective of the speed of said continuous member.

4. The sortation system in claim 2 wherein said control books at least one transport position for receipt of product from either of said induction units.

5. The sortation system in claim 4 wherein said control books a transport position for a product when that product is at a booking conveying unit and adjusts relative spacing between product and the respective transport position booked for that product on ones of said conveying units downstream of said booking conveying unit, wherein multiple product can be booked on either of said induction units and awaiting discharge to said continuous member.

6. The sortation system in claim 4 wherein said control maintains any booking of transport units for product on said at least one induction unit notwithstanding variation in speed of said continuous member.

7. The sortation system in claim 4 wherein said control maintains any booking of transport units for product on said at least one induction unit notwithstanding a substantial halt in speed of said continuous member.

8. The sortation system in claim 3 wherein, when in a no-gap mode, said at least one of said at least two induction units discharges product to said continuous member with insufficient gap between product if a sufficient gap cannot be achieved.

9. The sortation system in claim 8 wherein said sorter discharges product with an insufficient gap to a recirculation line.

10. The sortation system in claim 1 wherein said at least one induction unit includes another induction unit that does not follow said continuous member and can decrease in speed irrespective of said continuous member.

11. The sortation system in claim 1 further including a product source, wherein said product source substantially excludes product accumulation.

12. The sortation system in claim 1 further including a product source, wherein said product source comprises substantially only belt conveyors.

13. The sortation system in claim 1 wherein said conveying units are closed-loop regulated.

14. The sortation system in claim 1 wherein said conveying units are belt conveyors.

15. The sortation system in claim 1 wherein said conveying units have particular lengths and wherein said induction units are adapted to discharging product to said continuous member having a dimension that is greater than said particular lengths.

16. A method of inducting product from a product source to a sorter, the sorter including a continuous member defining a plurality of transport positions of said continuous member and a plurality of sort destinations for receiving product discharged from said continuous member, comprising:

providing at least one induction unit including a plurality of tandem conveying units and operating said conveying units at nominal speeds;

receiving product with said at least one induction unit from the product source and discharging product from said at least one induction unit to the continuous member; and when in a particular mode then adjusting said nominal speeds of said conveying units to follow a speed of the continuous member including starting substantially as soon as the continuous member is moving and decreasing in speed only when the continuous member decreases in speed.

17. The method of inducting of claim 16 wherein said at least one induction unit comprises at least two induction units, and including discharging product to said continuous member.

18. The method of inducting of claim 17 including starting said nominal speeds of said conveying units of at least one of said at least two induction units substantially as soon as said continuous member is moving and decreasing said nominal speeds of said conveying units of said at least one of said at least two induction units substantially only when said continuous member decreases in speed, and further including at least occasionally decreasing nominal speeds of said conveying units of another of said induction units in speed irrespective of the speed of said continuous member.

19. The method of inducting of claim 18 when said at least one of said at least two induction units is in a no-gap mode then at least occasionally discharging product from said at least one of said induction units to said continuous member with insufficient gap between product if a sufficient gap cannot be achieved.

20. The method of inducting of claim 19 including discharging product with an insufficient gap to a recirculation line.

21. The method of inducting of claim 17 including booking at least one transport position for receipt of product from either of said induction units.

22. The method of inducting of claim 21 including booking a transport position for a product when that product is at a booking conveying unit and adjusting relative spacing between product and the respective transport position booked for that product on ones of said conveying units downstream of said booking conveying unit.

23. The method of inducting of claim 21 including maintaining any booking of transport units for product on said at least one induction unit notwithstanding variation in speed of said continuous member.

24. The method of inducting of claim 23 including maintaining any booking of transport units for product on said at least one induction unit notwithstanding a substantial halt in speed of said continuous member.

25. The method of inducting of claim 16 including providing another induction unit that does not follow said continuous member and can decrease in speed irrespective of said continuous member.

26. The method of inducting of claim 16 including providing a product source, wherein said product source substantially excludes product accumulation.

27. The method of inducting of claim 16 including providing a product source, wherein said product source comprises substantially only belt conveyors.

28. The method of inducting of claim 16 including closed-loop regulating said conveying units.

29. The method of inducting of claim 16 wherein said conveying units are belt conveyors.

30. The method of inducting of claim 16 wherein said conveying units have particular lengths and including at least occasionally discharging product to said continuous member having a dimension that is greater than said particular lengths.

* * * * *

UNITED STATES PATENT AND TRADEMARK OFFICE
CERTIFICATE OF CORRECTION

PATENT NO.    : 6,513,641 B1                                       Page 1 of 1
DATED         : February 4, 2003
INVENTOR(S)   : Artemio Affaticati and Claudio Cerutti It is certified that error appears in the above-identified patent and that said Letters Patent is hereby corrected as shown below:

Column 3,
Line 53, "35" should be -- 3-5 --

Column 13,
Line 25, "seed" should be -- speed --
Line 32, "stat" should be -- start --

Column 16,
Line 4, "inducing" should be -- inducting --

Signed and Sealed this

First Day of July, 2003

JAMES E. ROGAN
*Director of the United States Patent and Trademark Office*